United States Patent
Ishii

(10) Patent No.: US 9,995,582 B2
(45) Date of Patent: Jun. 12, 2018

(54) VIBRATING ELEMENT, VIBRATING DEVICE, ELECTRONIC APPARATUS, AND MOVING OBJECT

(71) Applicant: Seiko Epson Corporation, Tokyo (JP)

(72) Inventor: Masahiro Ishii, Suwa (JP)

(73) Assignee: Seiko Epson Corporation (JP)

( * ) Notice: Subject to any disclaimer, the term of this patent is extended or adjusted under 35 U.S.C. 154(b) by 213 days.

(21) Appl. No.: 14/454,888

(22) Filed: Aug. 8, 2014

(65) Prior Publication Data
US 2015/0040664 A1 Feb. 12, 2015

(30) Foreign Application Priority Data

Aug. 9, 2013 (JP) ................. 2013-166004

(51) Int. Cl.
*G01C 19/56* (2012.01)
*G01P 9/04* (2006.01)
*G01C 19/5607* (2012.01)

(52) U.S. Cl.
CPC ......... *G01C 19/5607* (2013.01); *G01C 19/56* (2013.01)

(58) Field of Classification Search
None
See application file for complete search history.

(56) References Cited

U.S. PATENT DOCUMENTS

| 9,222,776 | B2* | 12/2015 | Ishii | ................. G01C 19/5607 |
| 2004/0154395 | A1* | 8/2004 | Kikuchi | ............ G01C 19/5607 73/503.3 |
| 2008/0236281 | A1* | 10/2008 | Noguchi | ............ G01C 19/5607 73/504.16 |
| 2009/0066194 | A1 | 3/2009 | Yamamoto | |
| 2009/0120187 | A1 | 5/2009 | Ohuchi et al. | |
| 2010/0207495 | A1* | 8/2010 | Kikushima | ............... H03H 3/02 310/370 |
| 2010/0277041 | A1 | 11/2010 | Yamazaki et al. | |
| 2011/0198969 | A1 | 8/2011 | Furuhata et al. | |
| 2011/0221311 | A1 | 9/2011 | Iwai | |
| 2011/0227452 | A1* | 9/2011 | Yamada | ............. H03H 9/02062 310/323.01 |
| 2012/0240678 | A1 | 9/2012 | Ohuchi et al. | |
| 2013/0239685 | A1 | 9/2013 | Ishii | |

FOREIGN PATENT DOCUMENTS

| JP | 56-158520 A | 12/1981 |
| JP | 2005-229143 A | 8/2005 |
| JP | 2005-345404 A | 12/2005 |

(Continued)

*Primary Examiner* — Jill Culler
*Assistant Examiner* — Ruben Parco, Jr.
(74) *Attorney, Agent, or Firm* — Harness, Dickey & Pierce, P.L.C.

(57) ABSTRACT

A vibrating element includes a base part, drive arms containing first surfaces and second surfaces having front-back relations with the first surfaces, having groove portions provided on the first surface sides, and extended from the base part in extension directions, and drive parts provided to contain piezoelectric layers on the second surfaces, and section shapes of the drive arms orthogonal to the extension directions contain asymmetric section shapes with respect to virtual center lines passing through centers of widths in directions orthogonal to the extension directions.

8 Claims, 13 Drawing Sheets

(56) References Cited

FOREIGN PATENT DOCUMENTS

| | | | |
|---|---|---|---|
| JP | 2007-279001 | A | 10/2007 |
| JP | 2008-011348 | A | 1/2008 |
| JP | 2010-263317 | A | 11/2010 |
| JP | 2011-216924 | A | 10/2011 |
| JP | 2012-257141 | A | 12/2012 |
| JP | 2013-157703 | A | 8/2013 |
| JP | 2013-181940 | A | 9/2013 |
| JP | 2013-190304 | A | 9/2013 |
| JP | 2013-190305 | A | 9/2013 |
| JP | 2013-190306 | A | 9/2013 |
| JP | 2013-190307 | A | 9/2013 |
| JP | 2013-192013 | A | 9/2013 |
| WO | WO-2010-047115 | A1 | 4/2010 |

\* cited by examiner

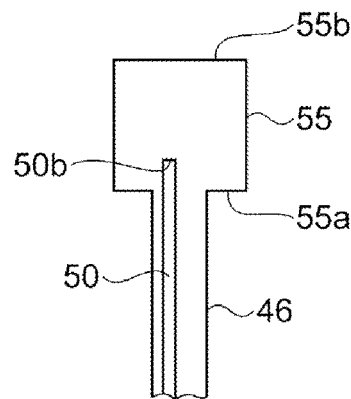
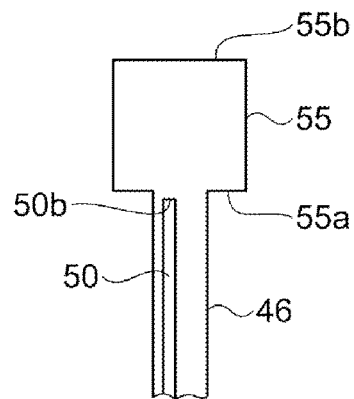
FIG. 9A  FIG. 9B
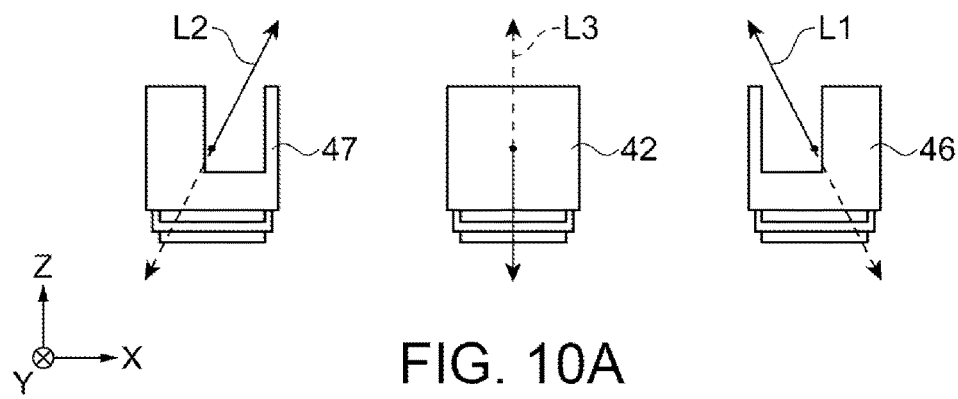
FIG. 10A
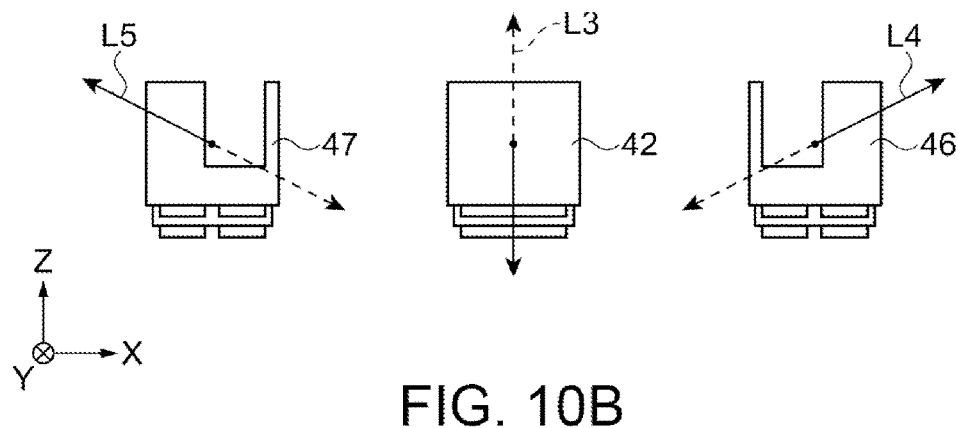
FIG. 10B

VIBRATING ELEMENT, VIBRATING DEVICE, ELECTRONIC APPARATUS, AND MOVING OBJECT

BACKGROUND

1. Technical Field

The present invention relates to a vibrating element and a vibrating device, an electronic apparatus, and a moving object using the vibrating element.

2. Related Art

Recently, as crystal oscillators used for electronic apparatuses and automobile as moving objects or vibrating elements used for vibrating devices including angular velocity sensors, the following elements have been known.

For example, a vibrating element disclosed in Patent Document 1 (JP-A-2011-216924) is a tuning-fork vibrating element including a plurality of vibrating arms, and has a base part having a thickness in a Z-axis direction and two vibrating arms extending from the base part in a Y-axis direction and provided in parallel in an X-axis direction, with groove portions respectively dug into front surfaces and rear surfaces for improvement in vibration efficiency. Further, excitation electrodes are formed on the respective vibrating arms (drive arms). In the vibrating element, the two vibrating arms are vibrated in plane in the X-axis directions when voltages are applied to the above described electrodes formed on the vibrating arms.

Further, a vibrating element disclosed in Patent Document 2 (WO 2010/047115) is a tuning-fork vibrating element that detects an angular velocity and has a plurality of vibrating arms (drive arms). The vibrating element has a base part and two vibrating arms extending from the base part in a Y-axis direction in parallel to each other and provided in parallel in an X-axis direction. The respective vibrating arms have grooves respectively formed on front surfaces and rear surfaces opposed in a Z-axis direction, and their section shapes are "S"-shapes. The respective vibrating arms are formed in the shapes, and thereby, fluctuations of the Q-value may be suppressed while the mechanical strength is maintained.

The above described vibrating element may be formed by processing a plate-like substrate of e.g., crystal or silicon in a desired shape. Specifically, masks corresponding to the shapes in the plan view of the vibrating element are formed on both sides of the substrate and the substrate is etched via the masks, and thereby, the vibrating element may be obtained.

However, in the above described vibrating element disclosed in Patent Document 1, it is necessary to dig the grooves from the respective front surfaces and rear surfaces of the vibrating arms (drive arms). Further, in the vibrating element disclosed in Patent Document 2, it is necessary to form the grooves on the front surfaces and the rear surfaces so that the shapes of the vibrating arms (drive arms) may have the "S"-shaped cross sections. Particularly, in order to form the "S"-shaped cross sections of the vibrating arms like those of the vibrating element disclosed in Patent Document 2, the grooves should be formed deeper and the groove widths should be suppressed for downsizing of the vibrating arms (vibrating element). It is difficult to process the grooves deeper while suppressing their widths and, for example, the grooves formed on the front surfaces may penetrate to the rear surfaces or open to the side surfaces to chip the side surfaces. Further, for digging the grooves from the respective front surfaces and rear surfaces and forming electrodes or piezoelectric members on the front surfaces and the rear surfaces, the processing process becomes complex and the number of steps of the processing increases. As described above, the vibrating element in related art has a problem that the larger number of steps are taken for formation of the vibrating arms having the grooves from the front and rear surfaces and processing is harder.

Here, the inventor of the application focuses on oblique vibration of the vibrating arms in a direction in which both vibration components in the Z-axis direction and the X-axis direction are synthesized by asymmetric cross section shapes of the vibrating arms (asymmetric with respect to the center line in the X-axis direction as the width direction of the vibrating arms) and proposes a vibrating element using the oblique vibration. Even in the vibrating element using the oblique vibration, for example, when the grooves are formed from the front and rear surfaces of the vibrating arms as in Patent Document 1 or Patent document 2, there is the above described problem that the larger number of steps are taken and processing is harder.

SUMMARY

An advantage of some aspects of the invention is to solve at least a part of the problems described above, and the invention can be implemented as the following forms or application examples.

Application Example 1

A vibrating element according to this application example includes a base part, a drive arm containing a first surface and a second surface having a front-back relation with the first surface, having a recessed portion on the first surface side, and extended from the base part in an extension direction, and a drive part on the second surface, wherein a section shape of the drive arm orthogonal to the extension direction contains an asymmetric section shape with respect to a virtual center line passing through a center of a width in a direction orthogonal to the extension direction.

According to this application example, the vibrating element having the drive arm (vibrating arm) that can be obliquely vibrated may be obtained by simple processing. The oblique vibration is a vibration having vibration components in two axis directions of a first axis and a second axis intersecting with each other in a plane containing the extension direction of the drive arm and a third axis intersecting with the two axes. The obliquely vibrating drive arm is provided, and thereby, vibration leakage is reduced and the vibrating element according to the application example is advantageous in vibration characteristics. Further, processing is simple and yield is improved. Furthermore, the drive arm may be obliquely vibrated with low impedance. Specifically, the recessed portion of the drive arm forming the vibrating element is provided on the first surface. That is, the recessed portion may be formed by digging from one surface, and thereby, the recessed portion containing the asymmetric section shape with respect to the virtual center line may be easily formed. In addition, the drive part is provided on the second surface as the rear surface for the first surface. Therefore, according to the configuration, the drive arm in which the recessed portion is provided on one surface (first surface) and the drive part is provided on the rear surface (second surface) may be easily formed, and the vibrating element that can continue stable oblique vibration may be inexpensively provided.

Application Example 2

In the vibrating element according to the application example described above, it is preferable that the drive part includes a piezoelectric member and a plurality of electrodes provided in parallel in a width direction orthogonal to the extension direction.

According to this application example, the impedance of the so-called in-plane vibration that the drive arm vibrates in a plane direction containing the extension direction of the drive arm may be reduced, and the in-plane vibration may be easily obtained.

Application Example 3

In the vibrating element according to the application example described above, it is preferable that the recessed portion is provided on the drive arm along the extension direction, but does not reach the base part.

According to this application example, when an impact or the like is externally applied, large stress is generated in the connecting part between the drive arm and the base part, however, in the configuration of the example, the part having the smaller section area of the drive arm produced by the recessed portion does not exist in the connecting part to the base part. Therefore, the vibrating element with improved impact resistance may be obtained.

Application Example 4

In the vibrating element according to the application example described above, it is preferable that the recessed portion is provided on the drive arm along the extension direction and reaches the base part.

According to this application example, the drive arm may be obliquely vibrated with low impedance.

Application Example 5

In the vibrating element according to the application example described above, it is preferable that the recessed portion is a groove portion.

According to this application example, the recessed portion is the groove portion and wall parts exist on both sides and the shape of the drive arm is more stable and stiffness is higher, and thereby, more stable vibration of the drive arm may be obtained.

Application Example 6

In the vibrating element according to the application example described above, it is preferable that a detection arm connected to the base part is provided.

According to this application example, changes of the vibration components in the two axis directions of the drive arm are detected by the detection arm, and thereby, angular velocities around the respective axes of the two axes intersecting with each other may be detected. In other words, the angular velocities around the respective axes of the axes intersecting with one another may be detected by one vibrating element.

Application Example 7

In the vibrating element according to the application example described above, it is preferable that the drive arm includes a first drive arm and a second drive arm provided in parallel, the recessed portion of the first drive arm is provided to deviate in a first direction with respect to the virtual center line of the first drive arm, and the recessed portion of the second drive arm is provided to deviate in an opposite direction to the first direction with respect to the virtual center line of the second drive arm.

According to this application example, the vibrations of the width direction components of the respective oblique vibrations of the first drive arm and the second drive arm are in opposite directions to each other, in other words, in opposite phase to each other, and vibration leakage may be reduced. Thereby, the vibrating element with improved vibration characteristics may be obtained.

Application Example 8

In the vibrating element according to the application example described above, it is preferable that the drive arm includes a first drive arm and a second drive arm provided in parallel, and an adjustment arm extended from the base part is provided between the first drive arm and the second drive arm.

According to this application example, the first and second drive arms and the adjustment arm flexurally vibrate in opposite directions to each other with respect to the Z-axis directions, in other words, flexurally vibrate in opposite phase to each other, and thereby, at least part of the vibrations of the Z-axis direction components of the flexural vibrations of the first and second drive arms and at least part of the vibration in the Z-axis directions of the adjustment arm are cancelled out. Accordingly, vibration leakage may be reduced by providing the adjustment arm.

Application Example 9

A vibrating device according to this application example includes the vibrating element according to any one of the application examples described above, and a housing container in which the vibrating element is housed.

According to this application example, the vibrating device that can continue stable oblique vibration and realize cost reduction may be obtained.

Application Example 10

An electronic apparatus according this application example includes the vibrating element according to any one of the application examples described above.

According to this application example, the vibrating element that can continue stable oblique vibration and realize cost reduction is provided, and the electronic apparatus in which more stable characteristics and lower cost are realized may be obtained.

Application Example 11

A moving object according this application example includes the vibrating element according to any one of the application examples described above.

According to this application example, the vibrating element that can continue stable oblique vibration and realize cost reduction is provided, and the moving object in which more stable characteristics and lower cost are realized may be obtained.

BRIEF DESCRIPTION OF THE DRAWINGS

The invention will be described with reference to the accompanying drawings, wherein like numbers reference like elements.

FIGS. 9A and 9B are sectional views showing a modified example of the gyro element shown in FIG. 7.

FIGS. 10A and 10B are sectional views for explanation of actions of the gyro element shown in FIG. 7, and FIG. 10A corresponds to the configuration in FIG. 8A and FIG. 10B corresponds to the configuration in FIG. 8B.

DESCRIPTION OF EXEMPLARY EMBODIMENTS

As below, a vibrating element, a vibrating device, an electronic apparatus, and a moving object according to the invention will be explained in detail according to embodiments shown in accompanying drawings.

Vibrating Device

First Embodiment

Figure 1:
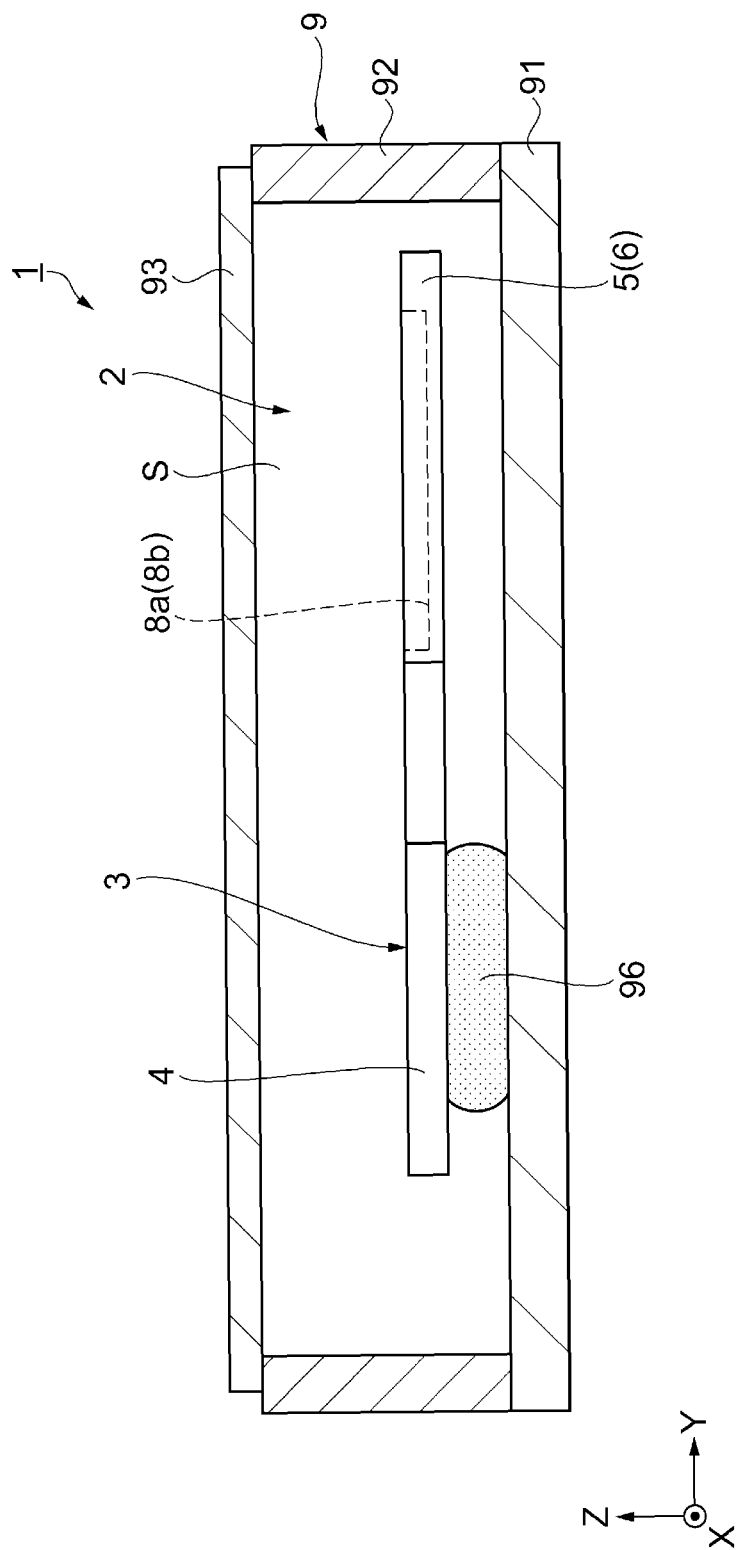
FIG. 1 is a sectional view showing a vibrating device according to a first embodiment of the invention.
Figure 2:
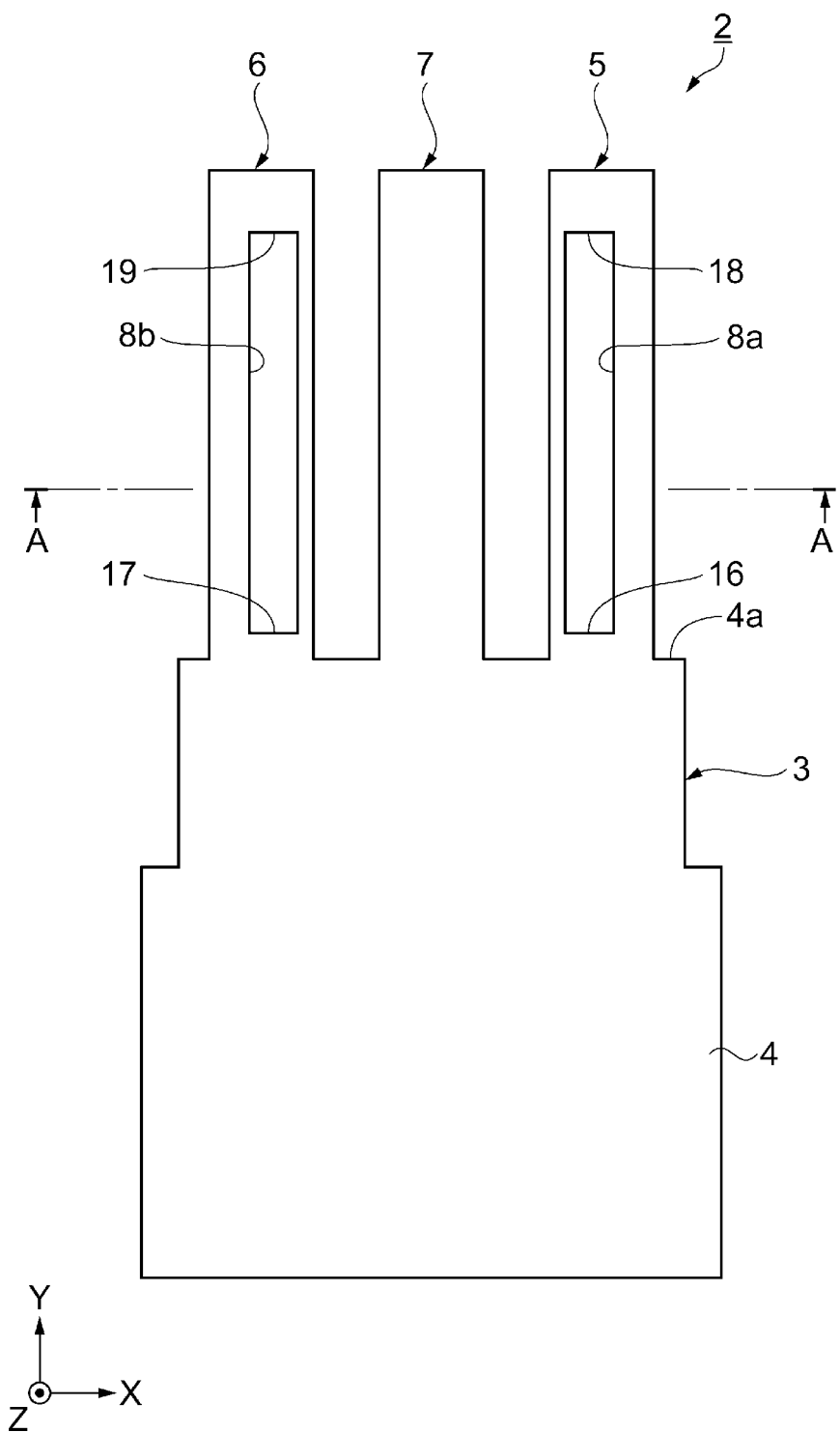
FIG. 2 is a plan view (top view) showing a vibrating element provided in the vibrating device shown in FIG. 1.
Figure 3A:
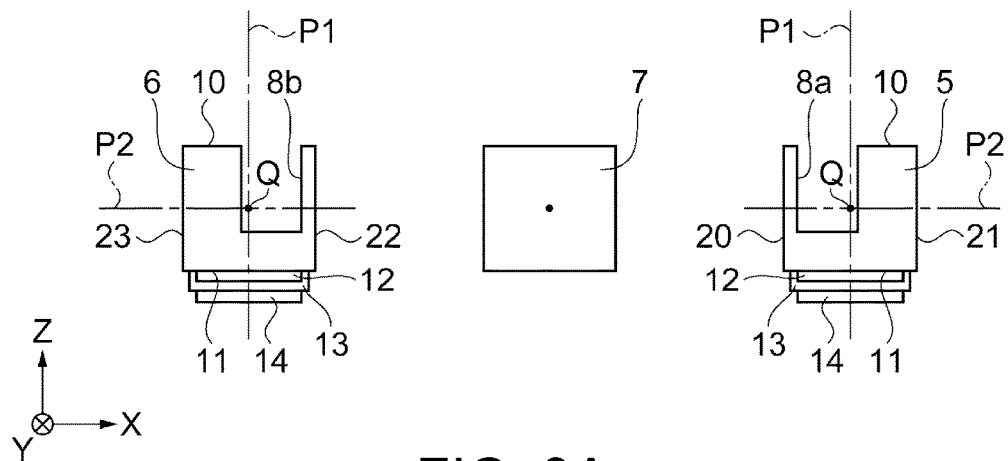
FIG. 3A is a sectional view along line A-A in FIG. 2
Figure 3B:
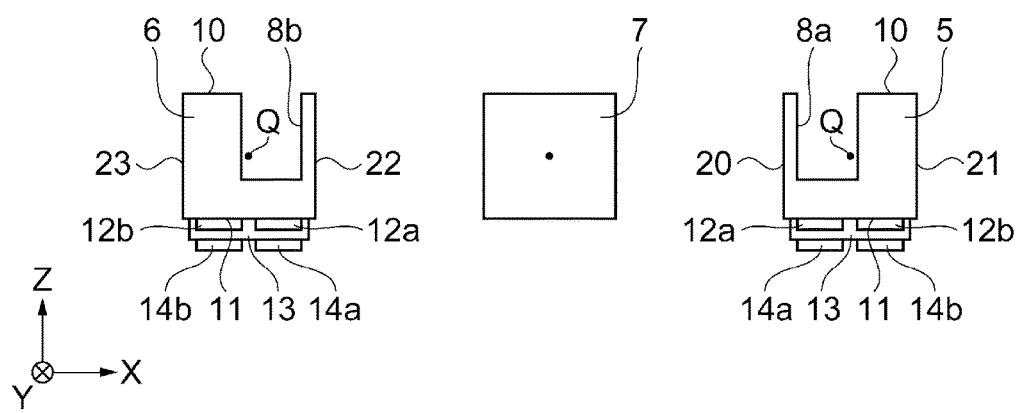
FIG. 3B is a similar sectional view showing a modified example of drive parts.
Figure 4A:
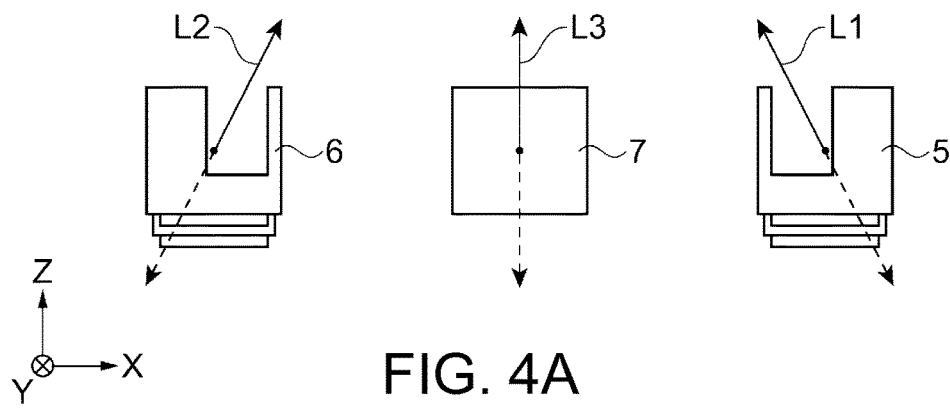
FIGS. 4A and 4B are sectional views for explanation of actions of the vibrating element shown in FIG. 2, and FIG. 4A corresponds to the drive part in FIG. 3A and FIG. 4B corresponds to the drive part in FIG. 3B.
Figure 4B:
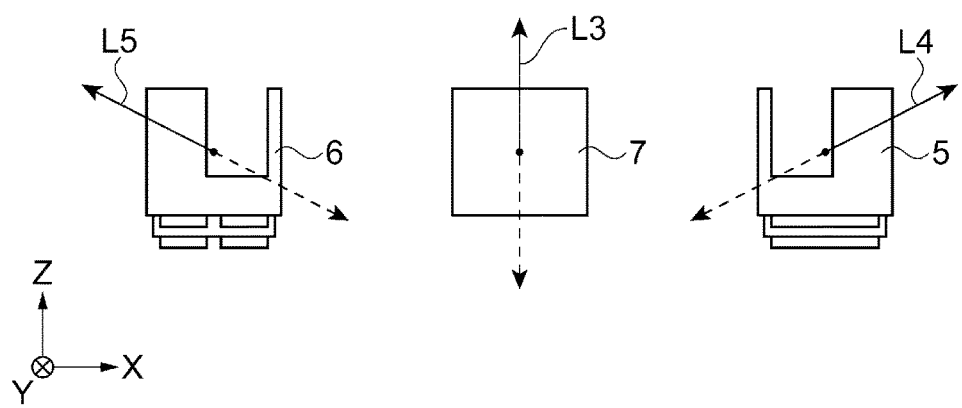
Figures 5A, 5B:
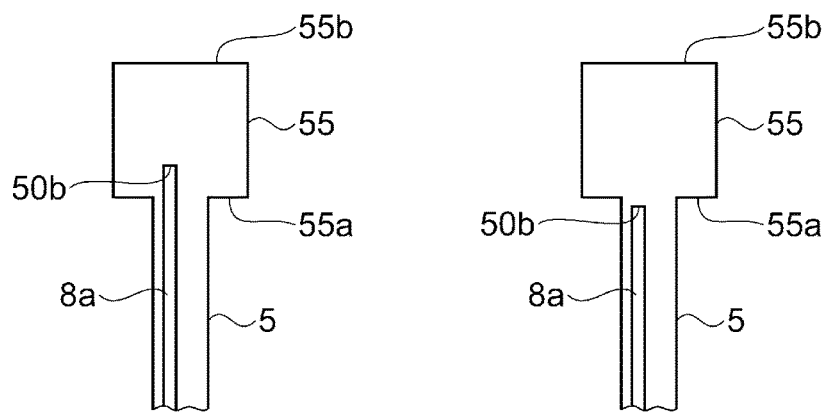
FIGS. 5A and 5B are sectional views showing a modified example of the vibrating element shown in FIG. 2.

A vibrator as a vibrating device according to a first embodiment of the invention will be explained using FIGS. 1 to 5. FIG. 1 is a sectional view showing the vibrating device according to the first embodiment of the invention, FIG. 2 is a plan view (top view) showing a vibrating element provided in the vibrating device shown in FIG. 1, FIG. 3A is a sectional view along line A-A in FIG. 2 showing a configuration of drive parts, and FIG. 3B is a similar sectional view showing a modified example of the drive parts. Further, FIGS. 4A and 4B are sectional views for explanation of actions of the vibrating element shown in FIG. 2, and FIG. 4A corresponds to the drive part in FIG. 3A and FIG. 4B corresponds to the drive part in FIG. 3B. Furthermore, FIGS. 5A and 5B are sectional views showing a modified example of the vibrating element shown in FIG. 2. Note that, in the respective drawings, for convenience of explanation, an X-axis (first direction), a Y-axis (second direction), and a Z-axis (third direction) are shown as three axes orthogonal to one another. Further, as below, a direction in parallel to the X-axis is also referred to as "X-axis direction (first direction)", a direction in parallel to the Y-axis is also referred to as "Y-axis direction (second direction)", and a direction in parallel to the Z-axis is also referred to as "Z-axis direction (third direction)". Furthermore, as below, a plane defined by the X-axis and the Y-axis is also referred to as "XY-plane", a plane defined by the Y-axis and the Z-axis is also referred to as "YZ-plane", and a plane defined by the X-axis and the Z-axis is also referred to as "XZ-plane". In addition, in the following explanation, for convenience of explanation, the upside in FIG. 1 is referred to as "upper" and the downside is referred to as "lower".

As shown in FIG. 1, a vibrator 1 as the vibrating device has a vibrating element 2 and a package 9 that houses the vibrating element 2. The package 9 has an internal space S formed by a base substrate 91, a frame member 92, and a lid member 93, and the vibrating element 2 is housed in the internal space. The vibrating element 2 is connected and fixed to the base substrate 91 by a fixing material 96. The vibrator 1 has a function of generating an electric signal that vibrates at a predetermined frequency (resonance frequency). As below, the respective parts forming the vibrator 1 will be sequentially explained in detail.

Vibrating Element

First, the vibrating element 2 will be explained with reference to FIGS. 2 and 3A. As shown in FIG. 2, the vibrating element 2 is a three-armed tuning-fork vibrating element. Further, the vibrating element 2 of the embodiment may generate an electric signal that vibrates at a predetermined frequency (resonance frequency). The vibrating element 2 has a base part 4 formed on an element substrate 3, three vibrating arms (drive arms 5, 6 and adjustment arm 7) extended from the base part 4, and a plurality of electrodes formed on the element substrate 3.

The element substrate 3 is formed using a silicon substrate as a material, for example. Drive parts containing piezoelectric layers 13 (see FIG. 3A) as piezoelectric members are provided on the element substrate 3, and the arm parts (drive arms 5, 6) are vibrated using the drive parts. As described above, the silicon substrate or the like is used as the material for the element substrate 3, and thereby, the element substrate 3 may be formed with high dimensional precision by etching. Note that the element substrate 3 may be formed using a piezoelectric material including crystal, lithium tantalate, lithium niobate, lithium borate, and barium titanate, for example. Also, in this case, the element substrate 3 may be formed with high dimensional precision by etching.

Base Part

As shown in FIG. 2, the base part 4 has a spread in the XY-plane and a plate shape with a thickness in the Z-axis direction. Further, the base part 4 is formed to have a thickness substantially equal to those of the vibrating arms (drive arms 5, 6 and adjustment arm 7). The three vibrating arms are connected to the base part 4. Of the vibrating arms, the drive arms 5, 6 function as driving arms for driving the vibrating element 2 and the adjustment arm 7 functions as an adjusting arm for cancelling out the vibrations of the drive arms 5, 6 in the Z direction.

The adjustment arm 7 is provided at the center of the base part 4 in the X-axis direction, and extended in the Y-axis direction from an end portion 4a of the base part 4 in the Y-axis direction. Further, the drive arm 5 and the drive arm 6 are provided at both end sides of the base part 4 in the X-axis direction so that the adjustment arm 7 may be located between the arms, and extended from the end portion 4a of the base part 4 in the Y-axis direction in the Y-axis direction. The drive arms 5, 6 and the adjustment arm 7 are respectively extended from the base part 4 in the Y-axis direction in parallel to each other. Further, the drive arms 5, 6 and the adjustment arm 7 are provided apart at nearly equal intervals in parallel in the X-axis direction. Furthermore, the drive arms 5, 6 and the adjustment arm 7 respectively have longitudinal shapes and their end portions are fixed ends and their distal end portions are free ends.

Drive Arms

As shown in FIGS. 2 and 3A, the drive arm 5 has a first surface (upper surface) 10 formed by the XY-plane and a second surface (lower surface) 11 formed by the XY-plane and having a front-back relation with the first surface, and has side surfaces 20, 21 connecting the first surface 10 and the second surface 11. A groove portion 8a having a bottom as a recessed portion dug from the first surface 10 is provided on the drive arm 5. One end 16 as an end of the groove portion 8a at the base part 4 side is provided not to reach the end portion 4a of the base part 4. The one end 16 of the groove portion 8a is provided as described above, and thereby, a part having a smaller section area of the drive arm 5 produced by providing the groove portion 8a does not exist in the connecting part between the drive arm 5 and the base part 4, and strength reduction of the drive arm 5 in the connecting part between the drive arm 5 and the base part 4 is not caused. Thereby, impact resistance of the vibrating element 2 may be improved. Further, another end 18 as an end of the groove portion 8a at the distal end portion side is provided in a location such that the end may not reach the distal end of the drive arm 5, in other words, in a location having a distance from the distal end portion.

Furthermore, as another embodiment than the embodiment, the one end 16 as the end of the groove portion 8a at the base part 4 side may be provided to reach the end portion 4a of the base part 4. In addition, as yet another embodiment than the embodiment, the one end 16 as the end of the groove portion 8a at the base part 4 side is provided on the base part 4 and the other end 18 of the groove portion 8a is provided on the base part 4, and thereby, the groove portion 8a may be formed over both the drive arm 5 and the base part 4. The groove portion 8a is formed as described above, and thereby, deformation at the base side of the drive arm 5 and deformation of the connecting part of the base part 4 to the drive arm 5 may be easily caused. As a result, the impedance of the drive arm 5 may be made smaller.

Further, the groove portion 8a is provided so that the distance between one side wall of the groove portion 8a and the side surface 20 may be smaller than the distance between the other side wall of the groove portion 8a and the side surface 21. That is, the groove portion 8a is provided to deviate to the adjustment arm 7 side with respect to a first virtual center line P1 passing through the center Q. Further, the drive arm 5 is provided to contain an asymmetric section shape with respect to the first virtual center line P1 passing through the center Q of a width in a direction (X-axis direction) orthogonal to the extension direction (Y-axis direction) of the drive arm 5. In other words, the virtual center line P1 is a line that divides the maximum width of the drive arm 5 into two halves. That is, in the case where the side surfaces 20, 21 of the drive arm 5 are not flat surfaces unlike those shown in FIG. 3A, but fins having irregular shapes (not shown) due to etching are formed on the side surfaces 20, 21, the line divides the maximum width of the drive arm 5 including the irregular shapes into two halves. Further, the drive arm 5 has an asymmetric section shape in the Y-axis direction with respect to a second virtual center line P2 passing through the center Q of the thickness in the Z-axis direction (thickness direction). In other words, the virtual center line P2 is a line that divides the maximum thickness of the drive arm 5 into two halves. Accordingly, as will be described later, when the drive arm 5 is vibrated in the X-axis directions (in-plane directions), a vibration in the Z-axis directions (out-of-plane directions) is newly excited by the vibration. As a result, the drive arm 5 may be flexurally vibrated (hereinafter, also simply referred to as "oblique vibration") in directions having both direction components in the X-axis directions and the Z-axis directions, in other words, in directions oblique to both axes of the X-axis and the Z-axis.

Similarly, the drive arm 6 has a first surface (upper surface) 10 formed by the XY-plane and a second surface (lower surface) 11 formed by the XY-plane and having a front-back relation with the first surface, and has side surfaces 22, 23 connecting the first surface 10 and the second surface 11. A groove portion 8b having a bottom as a recessed portion dug from the first surface 10 is provided on the drive arm 6. One end 17 as an end of the groove portion 8b at the base part 4 side is provided not to reach the end portion 4a of the base part 4. The one end 17 of the groove portion 8b is provided as described above, and thereby, apart having a smaller section area of the drive arm 6 produced by providing the groove portion 8b does not exist in the connecting part between the drive arm 6 and the base part 4, and strength reduction of the drive arm 6 in the connecting part between the drive arm 6 and the base part 4 is not caused. Thereby, impact resistance of the vibrating element 2 may be improved. Further, another end 19 as an end of the groove portion 8b at the distal end portion side is provided in a location such that the end may not reach the distal end of the drive arm 6, in other words, in a location having a distance from the distal end portion.

Furthermore, as another embodiment than the embodiment, the one end 17 as the end of the groove portion 8b at the base part 4 side may be provided to reach the end portion 4a of the base part 4. In addition, as yet another embodiment than the embodiment, the one end 17 as the end of the groove portion 8b at the base part 4 side is provided on the base part 4 and the other end 19 of the groove portion 8b is provided on the base part 4, and thereby, the groove portion 8b may be formed over both the drive arm 6 and the base part 4. The groove portion 8b is formed as described above, and thereby, deformation at the base side of the drive arm 6 and deformation of the connecting part of the base part 4 to the drive arm 6 may be easily caused. As a result, the impedance of the drive arm 6 may be made smaller.

Note that the other ends 18, 19 of the groove portions 8a, 8b have been explained in position examples that do not reach the distal ends of the drive arms 5, 6, however, not limited to those. The groove portions 8a, 8b may reach the distal ends of the drive arms 5, 6 and the other ends may be open ends.

Further, the groove portion 8b is provided so that the distance between one side wall of the groove portion 8b and the side surface 22 may be smaller than the distance between the other side wall of the groove portion 8b and the side surface 23. That is, the groove portion 8b is provided to deviate to the adjustment arm 7 side with respect to a virtual center line P1 passing through the center Q. Further, the drive arm 6 is provided to contain an asymmetric section shape with respect to the first virtual center line P1 passing through the center Q of a width in a direction (X-axis direction) orthogonal to the extension direction (Y-axis direction) of the drive arm 6. In other words, the virtual center line P1 is a line that divides the maximum width of the drive arm 6 into two halves. That is, in the case where the side surfaces 22, 23 of the drive arm 6 are not flat surfaces unlike those shown in FIG. 3A, but fins having irregular shapes (not shown) due to etching are formed on the side surfaces 22, 23, the line divides the maximum width of the drive arm 6 including the irregular shapes into two halves. Further, the drive arm 6 has an asymmetric section shape in the Y-axis direction with respect to a second virtual center line P2 passing through the center Q of the thickness in the Z-axis direction. In other words, the virtual center line P2 is a line that divides the maximum thickness of the drive arm 6 into two halves. Accordingly, as will be described later, when the drive arm 6 is vibrated in the X-axis directions (in-plane directions), a vibration in the Z-axis directions (out-of-plane directions) is newly excited by the vibration. As a result, the drive arm 6 may be flexurally vibrated (hereinafter, also simply referred to as "oblique vibration") in directions having both direction components in the X-axis directions and the Z-axis directions, in other words, in directions oblique to both axes of the X-axis and the Z-axis.

As described above, the groove portion 8a is provided to deviate in the +X-axis direction with respect to the virtual center line P1 of the drive arm 5 and the groove portion 8b is provided to deviate in the −X-axis direction opposite to the +X-axis direction with respect to the virtual center line P1 of the drive arm 6. As another embodiment than the embodiment, the groove portion 8a may be provided to deviate in the −X-axis direction with respect to the virtual center line P1 of the drive arm 5 and the groove portion 8b may be provided to deviate in the +X-axis direction opposite to the −X-axis direction with respect to the virtual center line P1 of the drive arm 6. Note that the above described groove portions 8a, 8b may be formed by a simple method such as etching with high dimensional precision like the formation of the element substrate 3.

As shown in FIG. 3A, in the vibrating element 2 of the embodiment, the drive parts containing the piezoelectric layers 13 as piezoelectric members are provided on the second surfaces 11 having the front-back relations with the first surfaces 10 of the drive arm 5 and the drive arm 6. The drive part is formed by stacking a first electrode layer 12, the piezoelectric layer (piezoelectric thin film) 13 as the piezoelectric member, and a second electrode layer 14 in this order on each second surface 11 of the drive arm 5 and the drive arm 6. The drive parts containing the piezoelectric layers 13 have functions of expanding and contracting by energization and obliquely vibrating the drive arm 5 and the drive arm 6. More specifically, the drive parts containing the piezoelectric layers 13 have functions of expanding and contracting and obliquely vibrating the drive arm 5 and the drive arm 6 by application of electric fields of alternating voltages between the first electrode layers 12 and the second electrode layers 14. As described above, when the drive arm 5 and the drive arm 6 are vibrated using the drive parts containing the piezoelectric layers 13, the element substrate 3 may be formed using a silicon substrate, for example.

As a constituent material of the first electrode layers 12 and the second electrode layers 14, for example, a metal material including gold (Au), a gold alloy, platinum (Pt), aluminum (Al), an aluminum alloy, silver (Ag), a silver alloy, chromium (Cr), a chromium alloy, copper (Cu), molybdenum (Mo), niobium (Nb), tungsten (W), iron (Fe), titanium (Ti), cobalt (Co), zinc (Zn), and zirconium (Zr) or a conducting material including indium tin oxide (ITO) may be used.

Of the materials, as the constituent material of the first electrode layers 12 and the second electrode layers 14, a metal consisting primarily of gold (gold, gold alloy) or platinum is preferably used, and a metal consisting primarily of gold (particularly, gold) is more preferably used. Au is advantageous in conductivity (lower electric resistance) and resistance to oxidation and preferable as an electrode material. Further, Au may be patterned by etching more easily than Pt.

Note that, for example, the first electrode layers 12 and the second electrode layers 14 are formed using gold and, when adhesion to the element substrate 3 is lower, it is preferable to provide foundation layers formed using Ti, Cr, or the like between the first electrode layers 12 and the second electrode layers 14 and the element substrate 3. Thereby, adhesion between the foundation layers and the drive arms 5, 6 and adhesion between the foundation layers and the first electrode layers 12 may be respectively made advantageous. As a result, separation of the first electrode layers 12 from the drive arms 5, 6 may be reduced and reliability of the vibrating element 2 may be made advantageous.

As a constituent material of the piezoelectric layers 13, for example, zinc oxide (ZnO), aluminum nitride (AlN), lithium tantalate (LiTaO$_3$), lithium niobate (LiNbO$_3$), potassium niobate (KNbO$_3$), lithium tetraborate (Li$_2$B$_4$O$_7$), barium titanate (BaTiO$_3$), PZT (lead zirconate titanate), or the like may be used, and AlN or ZnO is preferably used.

Adjustment Arm

The adjustment arm 7 has constant thickness (length in the Z-axis direction) and width (length in the X-axis direction) over the entire region in its longitudinal direction (Y-axis direction as the extension direction). The adjustment arm 7 vibrates according to the vibrations of the drive arm 5 and the drive arm 6.

Action of Drive Arms and Adjustment Arm

Also, with reference to FIG. 4A, the action of the drive arms 5, 6 and the adjustment arm 7 will be explained.

In the above described configuration, when the alternating voltages are applied between the first electrode layers 12 and the second electrode layers 14 by a power source, the respective piezoelectric layers 13 expand or contract in the Y-axis directions and the drive arm 5 and the drive arm 6 flexurally vibrate in the Z-axis directions at a certain constant frequency (resonance frequency). In this regard, in the drive arm 5 and the drive arm 6, new flexural vibrations in the X-axis directions due to their shapes are excited by the vibrations in the Z-axis directions. By the new flexural vibrations, the drive arm 5 and the drive arm 6 obliquely vibrate by synthesis of the flexural vibrations in the X-axis directions and the flexural vibrations in the Z-axis directions, and vibrate in directions oblique to the Z-axis and the X-axis as shown by arrows L1, L2 in FIG. 4A (i.e., obliquely vibrate) because the section shapes of the drive arm 5 and the drive arm 6 are asymmetric with respect to the XY-plane and the YZ-plane. Further, the drive arm 5 and the drive arm 6 flexurally vibrate symmetrically with respect to the ZY-plane.

On the other hand, the adjustment arm 7 flexurally vibrates in the Z-axis directions as directions of an arrow L3 shown in FIG. 4A opposite to the vibrations of the drive arm 5 and the drive arm 6 in the Z-axis directions at the same time with the flexural vibrations of the drive arm 5 and the drive arm 6.

In the vibrations, the drive arm 5 and the drive arm 6 symmetrically vibrate with respect to the YZ-plane, and thus, the vibration of the X-axis direction component of the flexural vibration of the drive arm 5 and the vibration of the X-axis direction component of the flexural vibration of the drive arm 6 are balanced and cancelled out. Accordingly, the vibration in the X-axis directions is not transmitted to the adjustment arm 7 and the adjustment arm 7 hardly vibrates in the X-axis directions. Further, the drive arm 5 and the drive arm 6 and the adjustment arm 7 flexurally vibrate in the opposite directions in the Z-axis directions, and the vibrations of the Z-axis direction components of the flexural vibrations of the drive arm 5 and the drive arm 6 and the vibration of the Z-axis direction component of the flexural vibration of the adjustment arm 7 are balanced and cancelled out. Thus, according to the vibrating element 2, vibration leakage may be effectively reduced.

Particularly, in the embodiment, the two obliquely vibrating drive arm 5 and drive arm 6 are located at both ends of the base part 4 (near both ends in the X-axis directions) and the vibrations in the out-of-plane directions (Z-axis directions) and the in-plane directions (X-axis directions) may be balanced (driven with balance), and thereby, the drive arm 5, the drive arm 6, and the adjustment arm 7 may be vibrated more stably. Accordingly, the vibration leakage may be reduced more effectively. Further, in the vibrating element 2, the adjustment arm 7 is provided and the vibrations in the Z-axis directions (translation) of the drive arm 5 and the drive arm 6 may be automatically cancelled out, and thereby, the moment of rotation may be cancelled to be smaller.

Modified Examples of Drive Parts

Note that, in the above description, the configuration of the drive part formed by stacking the first electrode layer 12, the piezoelectric layer (piezoelectric thin film) 13 as the piezoelectric member, and the second electrode layer 14 in this order on each second surface 11 of the drive arm 5 and the drive arm 6 has been explained, however, a configuration of the drive part shown in FIG. 3B may be employed. The detailed explanation will be made as below.

The drive part shown in FIG. 3B has a configuration in which a third electrode 12a and a fourth electrode 12b as a first electrode layer divided into two, a piezoelectric layer (piezoelectric thin film) 13 as a piezoelectric member, and a fifth electrode 14a and a sixth electrode 14b as a second electrode layer divided into two are stacked in this order on each second surface 11 of the drive arm 5 and the drive arm 6. More specifically, the third electrode 12a and the fourth electrode 12b as the first electrode layer are provided in parallel in the width direction (X-axis direction) of the drive arm 5 and the fifth electrode 14a and the sixth electrode 14b as the second electrode layer are provided in parallel in the width direction (X-axis direction) of the drive arm 5. In the drive part having the configuration, when alternating voltages are applied to the drive part containing the third electrode 12a, the piezoelectric layer 13, and the fifth electrode 14a and the drive part containing the fourth electrode 12b, the piezoelectric layer 13, and the sixth electrode 14b by a power source, the piezoelectric layer 13 corresponding to the third electrode 12a and the piezoelectric layer 13 corresponding to the fourth electrode 12b expand or contract in the Y-axis directions and the drive arm 5 and the drive arm 6 flexurally vibrate in the X-axis directions at a certain constant frequency (resonance frequency). Note that the drive arms vibrate in directions oblique to the Z-axis and the X-axis as shown by arrows L4, L5 in FIG. 4B (i.e., obliquely vibrate) because the section shapes of the drive arm 5 and the drive arm 6 are asymmetric with respect to the XY-plane and the YZ-plane like the above described embodiment. Further, the drive arm 5 and the drive arm 6 flexurally vibrate symmetrically with respect to the ZY-plane.

The above described drive arm 5 and the drive arm 6 may be vibrated both in the in-plane directions (X-axis directions) and the out-of-plane directions (Z-axis directions) as shown in FIGS. 4A and 4B. In this regard, the impedance is lower as the drive direction and the vibration direction are closer, and the drive direction may be selected. That is, the impedance is lower in the configuration of FIG. 4A in the case of vibration in directions closer to the Z-axis directions and in the configuration of FIG. 4B in the case of vibration in directions closer to the X-axis directions.

Note that, in the above described embodiment, the configuration in which no piezoelectric element (drive part) is provided on the adjustment arm 7 and the adjustment arm 7 vibrates with the vibrations of the drive arm 5 and the drive arm 6 has been explained, however, a piezoelectric element (drive part) may be provided on the adjustment arm 7 and the adjustment arm 7 may be vibrated in the Z-axis directions by the expansion and contraction of the piezoelectric element.

Further, in the above described embodiment, the example in which the thicknesses (lengths in the Z-axis direction) and the widths (lengths in the X-axis direction) are constant over the entire region in the longitudinal direction of the drive arm 5, the drive arm 6, and the adjustment arm has been explained, however, as shown in FIGS. 5A and 5B, wider parts (hammer heads) 55 wider than the drive arm 5 may be provided on the respective distal end portions. Note that, in FIGS. 5A and 5B, the drive arm 5 is shown as a representative example, and the same applies to a configuration in which the wider part (hammer head) is provided on the other drive arm or the adjustment arm. The groove portion 8a has an open end 55b and an end 55a at the base part side. Another end 50b of the groove portion 8a may be closer to the open end 55b side than the end 55a of the wider part 55 at the base part 4 (see FIG. 2) side, i.e., within the wider part 55 or may be in a location not reaching the end 55a at the base part 4 side, i.e., within the drive arm 5 as shown in FIG. 5B.

Package

Next, returning to FIG. 1, the package 9 as a housing container that houses and fixes the vibrating element 2 will be explained. As shown in FIG. 1, the package 9 has the plate-like base substrate 91, the frame-like frame member 92, and the plate-like lid member 93. The base substrate 91, the frame member 92, and the lid member 93 are stacked in this order from the downside to the upside (in the +Z direction). The base substrate 91 and the frame member 92 are formed using a ceramics material, which will be described later, or the like, and integrally baked with each other and joined. The frame member 92 and the lid member 93 are joined by an adhesive, a brazing filler metal, or the like. Further, the package 9 houses the vibrating element 2 in the internal space S defined by the base substrate 91, the frame member 92, and the lid member 93. Note that, in addition to the vibrating element 2, electronic components (oscillator circuit) that drive the vibrating element 2 etc. may be housed within the package 9.

As a constituent material of the base substrate 91, an insulating (non-conducting) material is preferable. For example, various kinds of glass, various kinds of ceramics materials including oxide ceramics, nitride ceramics, carbide-based ceramics, various kinds of resin materials including polyimide, or the like may be used.

Further, as a constituent material of the frame member 92 and the lid member 93, for example, the same constituent material as the base substrate 91, various kinds of metal materials including Al, Cu, and kovar, various kinds of glass, or the like may be used.

To the upper surface of the base substrate 91, the above described vibrating element 2 is fixed via the fixing material 96. The fixing material 96 includes an epoxy-based, polyimide-based, or silicone-based adhesive, for example. The fixing material 96 is formed by applying an uncured (unsolidified) adhesive onto the base substrate 91, further, mounting the vibrating element 2 on the adhesive, and curing and solidifying the adhesive. Thereby, the vibrating element 2 is reliably fixed to the base substrate 91. Note that the fixation may be performed using an epoxy-based, polyimide-based, or silicone-based conducting adhesive containing conducting particles.

According to the above explained first embodiment, the vibrating element 2 having the drive arms 5, 6 that can be obliquely vibrated may be obtained by simple processing including etching. The obliquely vibrated drive arms 5, 6 are provided, and thereby, the vibrating element 2 with suppressed vibration leakage and advantageous vibration characteristics may be obtained. In addition, the processing is simple and the yield is improved. Further, the groove portions 8a, 8b as the recessed portions are provided on the first surfaces 10 in the drive arms 5, 6. That is, the groove portions 8a, 8b may be formed by digging from one surfaces (first surfaces 10) by etching or the like, and thereby, the groove portions 8a, 8b containing the asymmetric section shapes with respect to the first virtual center lines P1 may be easily formed. Furthermore, the drive parts containing the piezoelectric layers 13 are provided on the second surfaces 11 as the rear surfaces for the first surfaces 10. The second surfaces 11 are flat surfaces without the groove portions 8a, 8b and the drive parts may be easily formed thereon. Therefore, according to the configuration, the drive arms 5, 6 in which the groove portions 8a, 8b are formed on the one surfaces (first surfaces 10) and the drive parts are provided on the rear surfaces (second surfaces 11) may be easily formed, and the vibrating element 2 that can continue stable oblique vibrations, i.e., the vibrator 1 may be inexpensively provided.

Second Embodiment

Figure 6:
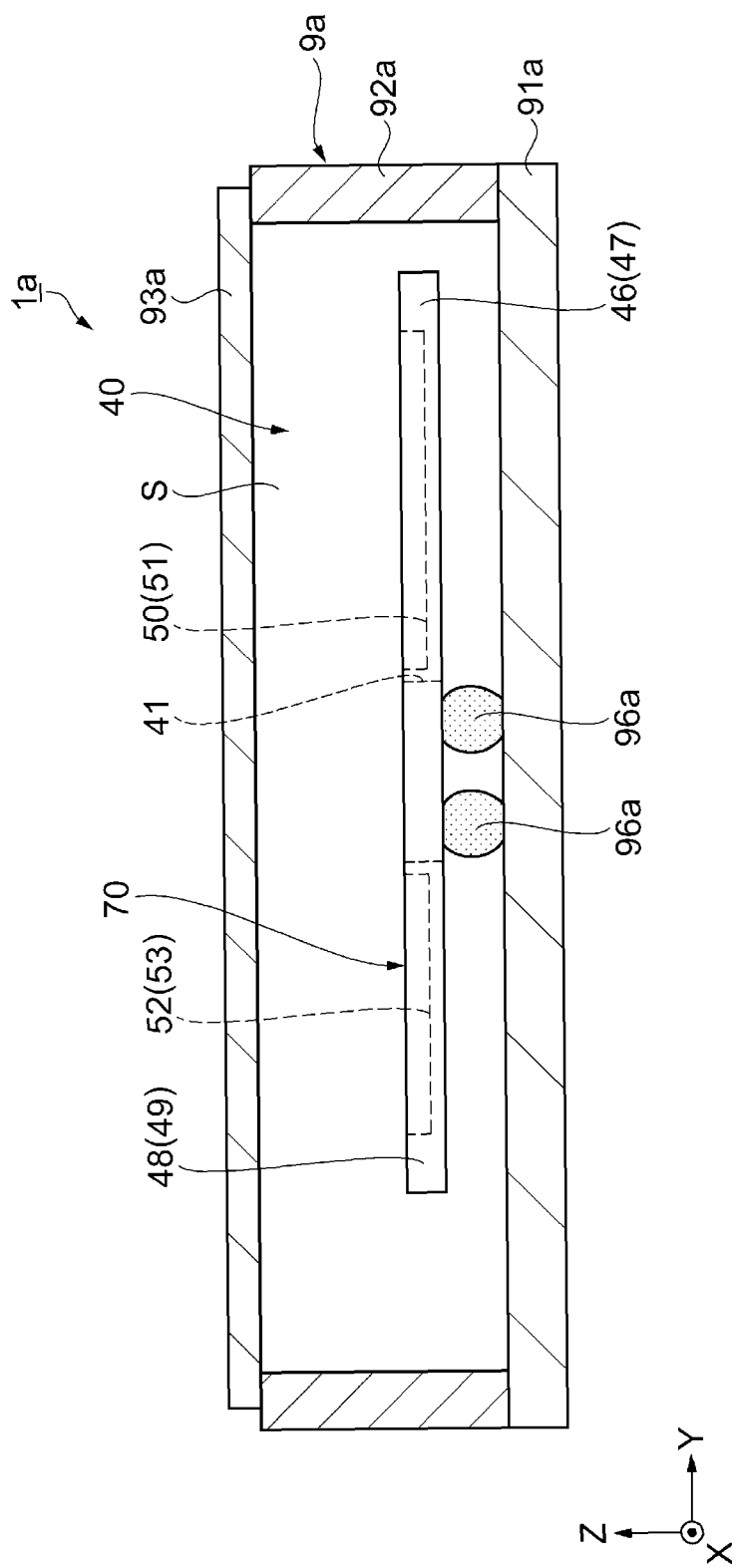
FIG. 6 is a sectional view showing a vibrating device according to a second embodiment of the invention.
Figure 7:
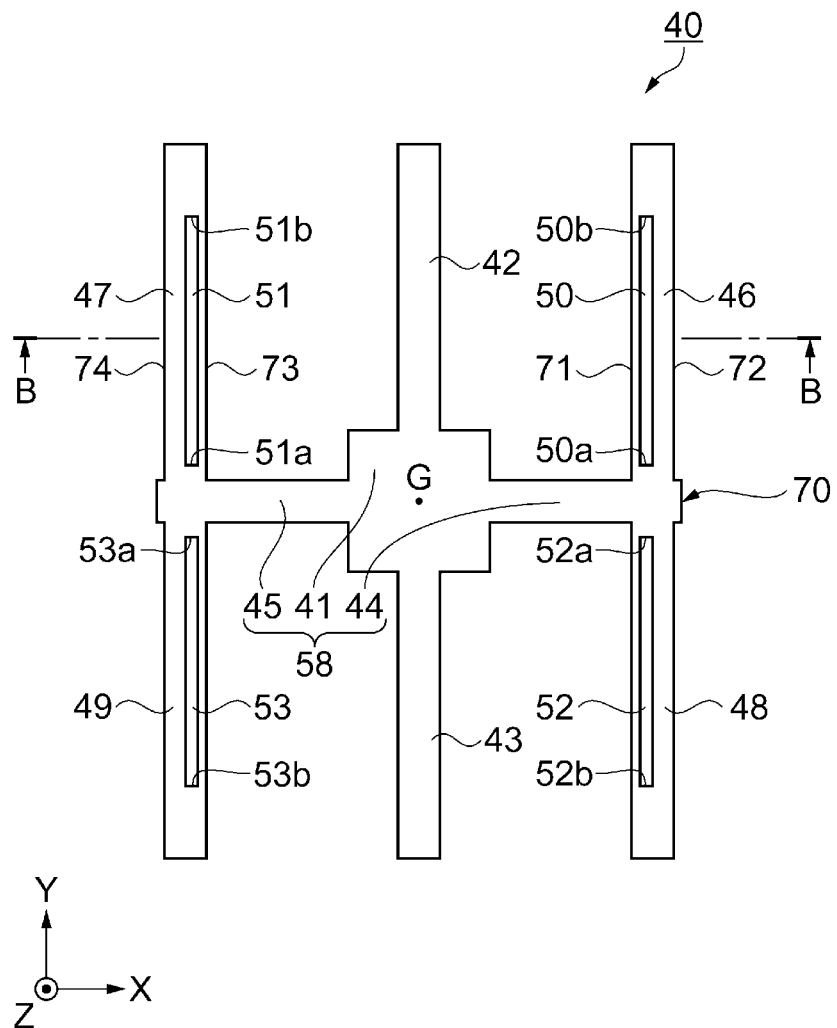
FIG. 7 is a plan view (top view) showing a gyro element as a vibrating element provided in the vibrating device shown in FIG. 6.
Figure 8A:
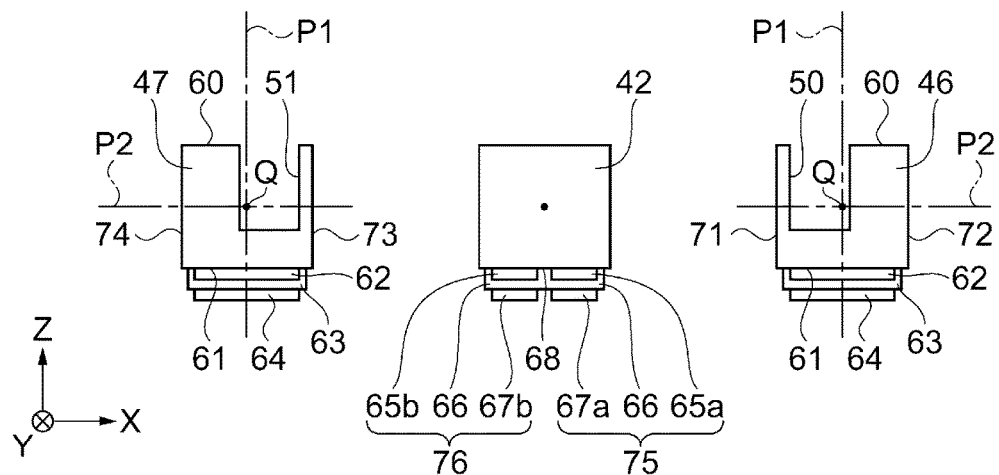
FIG. 8A is a sectional view along line B-B in FIG. 7
Figure 8B:
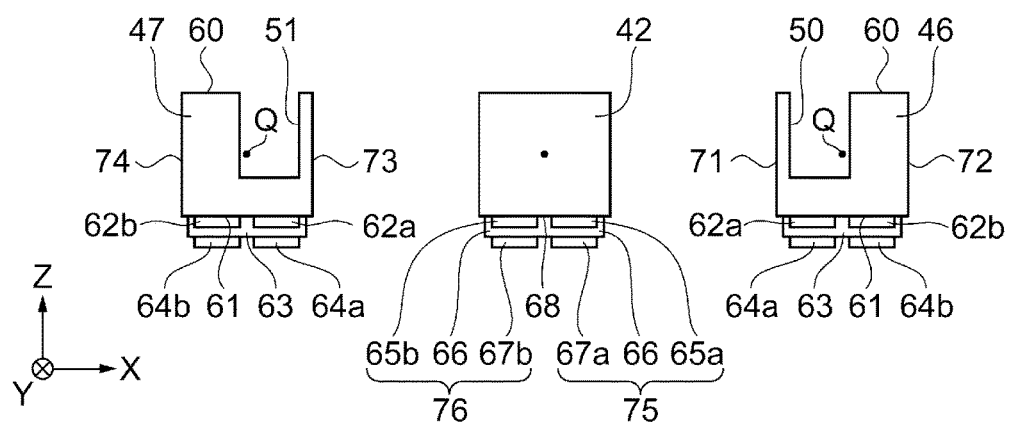
FIG. 8B is a similar sectional view showing a modified example of drive parts.
Figure 11:
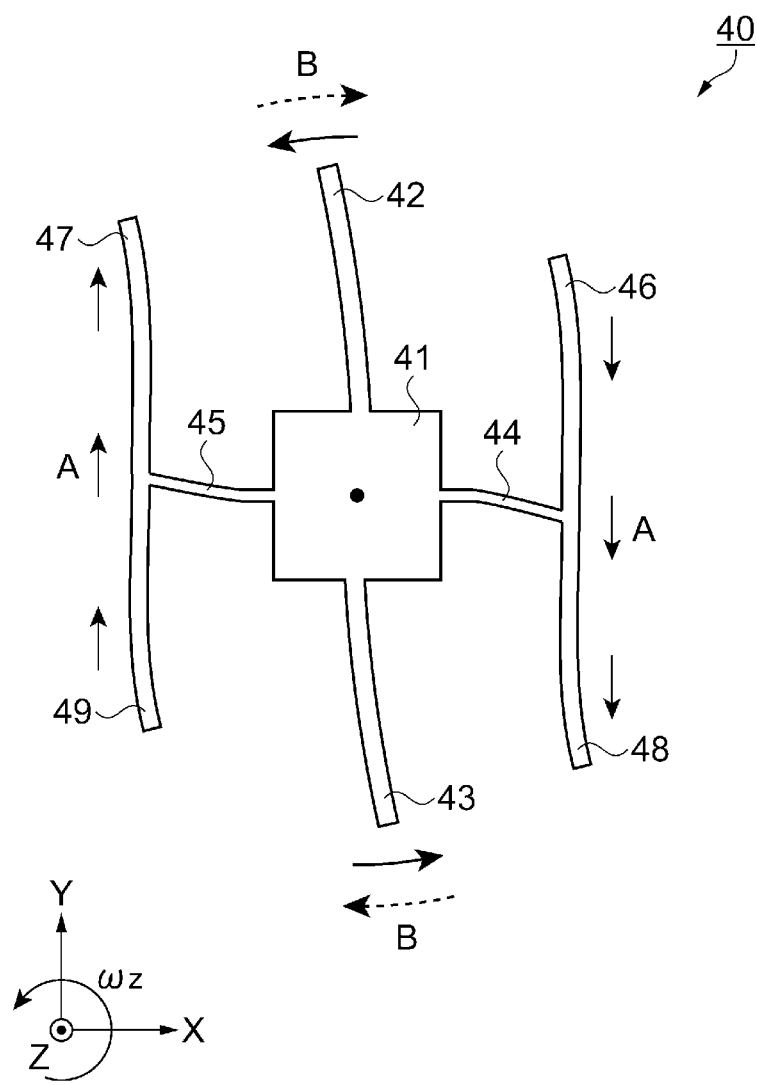
FIG. 11 is a plan view showing a vibration of the gyro element when an angular velocity around a Z-axis is applied.
Figure 12:
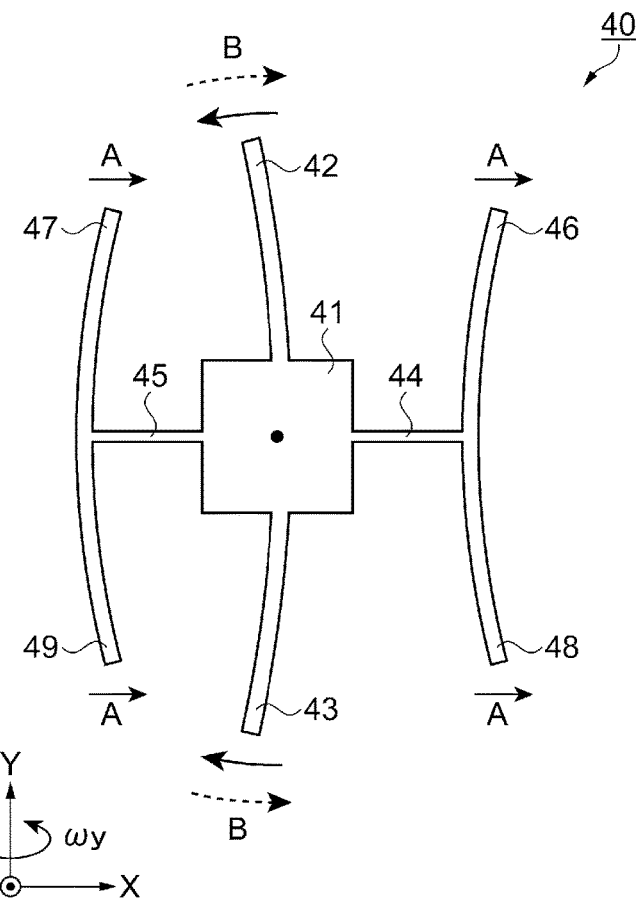
FIG. 12 is a plan view showing a vibration of the gyro element when an angular velocity around a Y-axis is applied.

Next, a gyro sensor as a vibrating device according to a second embodiment of the invention will be explained. FIG. 6 is a sectional view showing the gyro sensor as the vibrating device according to the second embodiment of the invention, FIG. 7 is a plan view (top view) showing a gyro element as a vibrating element provided in the vibrating device shown in FIG. 6, FIG. 8A is a sectional view along line B-B in FIG. 7, FIG. 8B is a similar sectional view showing a modified example of drive parts, and FIGS. 9A and 9B are sectional views showing a modified example of the gyro element shown in FIG. 7. Further, FIGS. 10A and 10B are sectional views for explanation of actions of vibrating arm of the gyro element shown in FIG. 7, and FIG. 10A corresponds to the drive parts in FIG. 8A and FIG. 10B corresponds to the drive parts in FIG. 8B. Furthermore, FIG. 11 is a plan view showing a vibration of the gyro element when an angular velocity around a Z-axis is applied, and FIG. 12 is a plan view showing a vibration of the gyro element when an angular velocity around a Y-axis is applied.

Note that the second embodiment will be explained as below with a focus on the differences from the above described embodiment and the explanation of the same items will be omitted. Further, as below, as shown in FIG. 1, three axes orthogonal to one another are an X-axis (first axis), a Y-axis (second axis) and a Z-axis (third axis). Furthermore, a direction in parallel to the X-axis is also referred to as "X-axis direction", a direction in parallel to the Y-axis is also referred to as "Y-axis direction", and a direction in parallel to the Z-axis is also referred to as "Z-axis direction". In addition, a plane defined by the X-axis and the Y-axis is also referred to as "XY-plane", a plane defined by the Y-axis and the Z-axis is also referred to as "YZ-plane", and a plane defined by the X-axis and the Z-axis is also referred to as "XZ-plane".

A gyro sensor 1a shown in FIG. 6 has a gyro element 40 as a vibrating element, and a package 9a that houses the gyro element 40. The package 9a has an internal space S formed by a base substrate 91a, a frame member 92a, and a lid member 93a, and the gyro element 40 is housed in the internal space. The gyro element 40 is connected and fixed to the base substrate 91 by a fixing material 96a. The gyro sensor 1a has a function of generating an electric signal that vibrates at a predetermined frequency (resonance frequency). The gyro sensor 1a is a gyro sensor that may detect an angular velocity ωz around the Z-axis and an angular velocity ωy around the Y-axis. As below, the respective parts forming the gyro sensor 1a will be sequentially explained in detail.

Gyro Element

First, the gyro element 40 will be explained with reference to FIGS. 7 and 8A. As shown in FIG. 7, the gyro element 40 is the so-called double-T-shaped gyro element. The gyro element 40 has an element substrate 70, and drive parts containing piezoelectric layers 63, 66 as a plurality of piezoelectric members formed on the element substrate 70.

The element substrate 70 is formed using a silicon substrate as a material, for example. The drive parts and detection parts containing piezoelectric layers 63, 66 (see FIG. 8A) as piezoelectric members are provided on the element substrate 70. Further, a first drive arm 46 and a third drive arm 48 as first drive arms and a second drive arm 47 and a fourth drive arm 49 as second drive arms are driven using the drive parts, and signals (output signals) are extracted from first, second detection arms 42, 43 using the detection parts.

As described above, the silicon substrate or the like is used as the material for the element substrate 70, and thereby, the element substrate 70 may be formed with high dimensional precision by etching. Note that the element substrate 70 may be formed using a piezoelectric material. The piezoelectric material includes crystal, lithium tantalate, lithium niobate, lithium borate, and barium titanate, for example. Specifically, as the piezoelectric material forming the element substrate 70, crystal is preferable. When the element substrate 70 is formed using crystal, the vibration characteristics (particularly, frequency-temperature characteristics) of the element substrate 70 may be made advantageous. Further, the element substrate 70 may be formed with high dimensional precision by etching.

The element substrate 70 has a spread in the XY-plane and a thickness in the Z-axis direction, and has a center base part 41, the first detection arm 42, the second detection arm 43, a first connecting arm 44, a second connecting arm 45, the first drive arm 46, the second drive arm 47, the third drive arm 48, and the fourth drive arm 49. Note that, in the following explanation, the first detection arm 42 and the second detection arm 43 may be collectively described as "first, second detection arms 42, 43", the first connecting arm 44 and the second connecting arm 45 may be collectively described as "first, second connecting arms 44, 45", the first drive arm 46, the second drive arm 47, the third drive arm 48, and the fourth drive arm 49 may be collectively described as "first, second, third, fourth drive arms 46, 47, 48, 49".

A base part 58 including the center base part 41 and the first connecting arm 44 and the second connecting arm 45 extended from the center base part 41 in opposite directions to each other in the X-axis directions is provided at the center of the element substrate 70. Further, the first detection arm 42 and the second detection arm 43 are extended from the center base part 41 in opposite directions to each other in the Y-axis directions. Note that the first detection arm 42 and the second detection arm 43 are not necessarily directly extended from the base part 41 as long as they are integrally connected with the base part 41. Further, the first drive arm 46 and the third drive arm 48 are extended from a distal end portion of the first connecting arm 44 in opposite directions to each other in the Y-axis directions. Furthermore, the second, fourth drive arms 47, 49 are extended from a distal end portion of the second connecting arm 45 in opposite directions to each other in the Y-axis directions.

Note that, in the illustrated configuration, the widths of the first connecting arm 44 and the second connecting arm 45 are narrower than the width of the center base part 41, however, they may be integrally formed with the center base part 41 in the same width. Further, the first, third drive arms 46, 48 may be extended from the middle of the first connecting arm 44 in the extension direction, and similarly, the second, fourth drive arms 47, 49 may be extended from the middle of the second connecting arm 45 in the extension direction.

Detection Arms

The first, second detection arms 42, 43 are symmetrically provided with respect to the XZ-plane intersecting with the center of gravity (center) G. Further, the first, second detection arms 42, 43 have nearly rectangular cross section shapes as shown in FIG. 8A. Two detection parts are formed in parallel in the X-axis direction on a second surface (lower surface) 68 of the first detection arm 42. The two detection parts include a first detection part 75 in which a first electrode layer 65a, a piezoelectric layer 66, and a second electrode layer 67a are stacked in this order, and a second detection part 76 in which a first electrode layer 65b, a piezoelectric layer 66, and a second electrode layer 67b are stacked in this order. Note that the piezoelectric layers 66 in this example are integrally formed, however, they are not necessarily integrally formed. They may be individually formed. The second detection part 76 has a potential as the ground with respect to the first detection part 75. Similarly, two detection parts are formed in parallel in the X-axis direction on a second surface (lower surface) of the second detection arm 43, and their explanation will be omitted because they have the same configurations.

In the configuration, when the first, second detection arms 42, 43 vibrate in a detection mode in which the arms are excited by application of at least one of the angular velocity ωy and the angular velocity ωz, the first detection part 75 and the second detection part 76 expand or contract. By the expansion or contraction, strain of the first, second detection arms 42, 43 may be extracted as signals (output signals) from between the first electrode layer 65a and the second electrode layer 67a (first detection part 75) and between the first electrode layer 65b and the second electrode layer 67b (second detection part 76).

Thus extracted signals from the two detection parts are processed in a manner, which will be described later, and thereby, the angular velocity ωy and the angular velocity ωz may be independently detected, respectively.

Note that the two detection parts are used, and thereby, strain of the first, second detection arms 42, 43 may be extracted as the signals more reliably with the simple configuration.

In the illustrated configuration, the section shapes of the first detection arm 42 and the second detection arm 43 are rectangular shapes, however, grooves may be provided on at least one surfaces of the upper surfaces and the lower surfaces of the first, second detection arms 42, 43.

Drive Arms

Next, the configurations of the first, second, third, fourth drive arms 46, 47, 48, 49 will be explained. Note that the first, second drive arms 46, 47 and the third, fourth drive arms 48, 49 are symmetrically provided with respect to the XZ-plane intersecting with the center of gravity (center) G. Therefore, in the explanation, the first, second drive arms 46, 47 will be explained and the explanation of the third, fourth drive arms 48, 49 will be omitted.

As shown in FIGS. 7 and 8A, the first drive arm 46 has a first surface (upper surface) 60 formed by the XY-plane and a second surface (lower surface) 61 formed by the XY-plane and having a front-back relation with the first surface, and has side surfaces 71, 72 connecting the first surface 60 and the second surface 61. A groove portion 50 having a bottom as a recessed portion dug from the first surface 60 is provided on the first drive arm 46. One end 50a as an end of the groove portion 50 at the first connecting arm 44 side is provided not to reach the first connecting arm 44. The one end 50a of the groove portion 50 is provided as described above, and thereby, a part having a smaller section area of the first drive arm 46 produced by providing the groove portion 50 does not exist in the connecting part between the first drive arm 46 and the first connecting arm 44, and strength reduction of the first drive arm 46 is not caused. Thereby, impact resistance of the gyro element 40 may be improved. Further, another end 50b as an end of the groove portion 50 at the distal end portion side is provided in a location such that the end may not reach the distal end of the first drive arm 46, in other words, in a location having a distance from the distal end portion.

Further, the groove portion 50 is provided so that the distance between one side wall of the groove portion 50 and the side surface 71 may be smaller than the distance between the other side wall of the groove portion 50 and the side surface 72. That is, the groove portion 50 is provided to deviate to the first detection arm 42 side with respect to the center Q. In other words, the first drive arm 46 is provided to contain an asymmetric section shape with respect to a first virtual center line P1 passing through the center Q in the width direction (X-axis direction) orthogonal to the extension direction (Y-axis direction) of the first drive arm 46. Further, the first drive arm 46 has an asymmetric section shape in the Y-axis direction with respect to a second virtual center line P2 passing through the center Q in the Z-axis direction. Accordingly, as will be described later, when the first drive arm 46 is vibrated in the X-axis directions (in-plane directions), a vibration in the Z-axis directions (out-of-plane directions) is newly excited by the vibration. As a result, the first drive arm 46 may be flexurally vibrated (hereinafter, also simply referred to as "oblique vibration")

in directions having both direction components in the X-axis directions and the Z-axis directions, in other words, in directions oblique to both axes of the X-axis and the Z-axis.

Similarly, the second drive arm 47 has a first surface (upper surface) 60 formed by the XY-plane and a second surface (lower surface) 61 formed by the XY-plane and having a front-back relation with the first surface, and has side surfaces 73, 74 connecting the first surface 60 and the second surface 61. A groove portion 51 having a bottom as a recessed portion dug from the first surface 60 is provided on the second drive arm 47. One end 51a as an end of the groove portion 51 at the second connecting arm 45 side is provided not to reach the second connecting arm 45. The one end 51a of the groove portion 51 is provided as described above, and thereby, a part having a smaller section area of the second drive arm 47 produced by providing the groove portion 51 does not exist in the connecting part between the second drive arm 47 and the second connecting arm 45, and strength reduction of the second drive arm 47 is not caused. Thereby, impact resistance of the gyro element 40 may be improved. Further, another end 51b as an end of the groove portion 51 at the distal end portion side is provided in a location such that the end may not reach the distal end of the second drive arm 47, in other words, in a location having a distance from the distal end portion.

Note that the other ends 50b, 51b of the groove portions 50, 51 have been explained in position examples that do not reach the distal ends of the first drive arm 46, the second drive arm 47, however, not limited to those. The groove portions 50, 51 may reach the distal ends of the first drive arm 46, the second drive arm 47 and the other ends may be open ends.

Further, the groove portion 51 is provided so that the distance between one side wall of the groove portion 51 and the side surface 73 may be smaller than the distance between the other side wall of the groove portion 51 and the side surface 74. That is, the groove portion 51 is provided to deviate to the first detection arm 42 side with respect to the center Q. In other words, the second drive arm 47 is provided to contain an asymmetric section shape with respect to a first virtual center line P1 passing through the center Q in the width direction (X-axis direction) orthogonal to the extension direction (Y-axis direction) of the second drive arm 47. Further, the second drive arm 47 has an asymmetric section shape in the Y-axis direction with respect to a second virtual center line P2 passing through the center Q in the Z-axis direction. Accordingly, as will be described later, when the second drive arm 47 is vibrated in the X-axis directions (in-plane directions), a vibration in the Z-axis directions (out-of-plane directions) is newly excited by the vibration. As a result, the second drive arm 47 may be flexurally vibrated (hereinafter, also simply referred to as "oblique vibration") in directions having both direction components in the X-axis directions and the Z-axis directions, in other words, in directions oblique to both axes of the X-axis and the Z-axis.

As described above, the groove portions 50, 51 are provided to deviate in the same direction with each other toward the virtual center lines passing through the centers in the thickness direction (Z-axis direction) of the first drive arm 46 and the second drive arm 47. Note that the groove portions 50, 51 may be formed by a simple method such as etching with high dimensional precision like the formation of the element substrate 70.

As shown in FIG. 8A, in the gyro element 40 of the embodiment, the drive parts containing the piezoelectric layers 63 as piezoelectric members are provided on the second surfaces 61 having the front-back relations with the first surfaces 60 of the first drive arm 46 and the second drive arm 47. The drive part is formed by stacking the first electrode layer 62, the piezoelectric layer (piezoelectric thin film) 63 as the piezoelectric member, and the second electrode layer 64 in this order on each second surface 61 of the first drive arm 46 and the second drive arm 47. The drive parts containing the piezoelectric layers 63 have functions of expanding and contracting by energization and obliquely vibrating the first drive arm 46 and the second drive arm 47. As described above, when the first drive arm 46 and the second drive arm 47 are vibrated using the drive parts containing the piezoelectric layers 63, the element substrate 70 may be formed using a silicon substrate, for example.

As a constituent material of the first electrode layers 62 and the second electrode layers 64, for example, a metal material including gold (Au), a gold alloy, platinum (Pt), aluminum (Al), an aluminum alloy, silver (Ag), a silver alloy, chromium (Cr), a chromium alloy, copper (Cu), molybdenum (Mo), niobium (Nb), tungsten (W), iron (Fe), titanium (Ti), cobalt (Co), zinc (Zn), and zirconium (Zr) or a conducting material including indium tin oxide (ITO) may be used.

Of the materials, as the constituent material of the first electrode layers 62 and the second electrode layers 64, a metal consisting primarily of gold (gold, gold alloy) or platinum is preferably used, and a metal consisting primarily of gold (particularly, gold) is more preferably used. Au is advantageous in conductivity (lower electric resistance) and resistance to oxidation and preferable as an electrode material. Further, Au may be patterned by etching more easily than Pt.

Note that, for example, the first electrode layers 62 and the second electrode layers 64 are formed using gold and, when adhesion to the element substrate 70 is lower, it is preferable to provide foundation layers formed using Ti, Cr, or the like between the first electrode layers 62 and the second electrode layers 64 and the element substrate 70. Thereby, adhesion between the foundation layers and the first drive arm 46 and the second drive arm 47 and adhesion between the foundation layers and the first electrode layers 62 may be respectively made advantageous. As a result, separation of the first electrode layers 62 from the first drive arm 46 and the second drive arm 47 may be reduced and reliability of the gyro element 40 may be made advantageous.

As a constituent material of the piezoelectric layers 13, for example, zinc oxide (ZnO), aluminum nitride (AlN), lithium tantalate ($LiTaO_3$), lithium niobate ($LiNbO_3$), potassium niobate ($KNbO_3$), lithium tetraborate ($Di_2B_4O_7$), barium titanate ($BaTiO_3$), PZT (lead zirconate titanate), or the like may be used, and AlN or ZnO is preferably used.

Modified Examples of Drive Parts

In the drive parts shown in FIG. 8B, a third electrode 62a and a fourth electrode 62b as a first electrode layer divided into two, a piezoelectric layer (piezoelectric thin film) 63 as a piezoelectric member, and a fifth electrode 64a and a sixth electrode 64b as a second electrode layer divided into two are stacked in this order on each second surface 61 of the first drive arm 46 and the second drive arm 47. In the drive parts having the configurations, when alternating voltages are applied to the drive part containing the third electrode 62a, the piezoelectric layer 63, and the fifth electrode 64a and the drive part containing the fourth electrode 62b, the piezoelectric layer 63, and the sixth electrode 64b by a power source, the piezoelectric layer 63 corresponding to the third electrode 62a and the piezoelectric layer 63 corresponding to the fourth electrode 62b expand or contract in the Y-axis directions and the first drive arm 46 and the second drive arm 47 flexurally vibrate in the X-axis directions at a certain constant frequency (resonance frequency). Note that the drive arms vibrate in directions oblique to the Z-axis and the X-axis as shown by arrows L4, L5 in FIG. 10B (i.e., obliquely vibrate) because the section shapes of the first drive arm 46 and the second drive arm 47 are asymmetric with respect to the XY-plane and the YZ-plane like the above described embodiment. Further, the first drive arm 46 and the second drive arm 47 flexurally vibrate symmetrically with respect to the ZY-plane.

Further, in the above described embodiment, the example in which the thicknesses (lengths in the Z-axis direction) and the widths (lengths in the X-axis direction) are constant over the entire region in the longitudinal direction (in the Y-axis direction as the extension direction) of the first drive arm 46 and the second drive arm 47 has been explained, however, as shown in FIGS. 9A and 9B, wider parts (hammer heads) 55 wider than the first drive arm 46 and the second drive arm 47 may be provided on the respective distal end portions. Note that, in FIGS. 9A and 9B, the first drive arm 46 is shown as a representative example. The groove portion 50 has an open end 55b and an end 55a at the first connecting arm 44 (see FIG. 7) side. Another end 50b of the groove portion 50 may be closer to the open end 55b side than the end 55a of the wider part 55 at the first connecting arm 44 side, i.e., within the wider part 55 as shown in FIG. 9A, or may be in a location not reaching the end 55a at the base part side, i.e., within the first drive arm 46. A wider part corresponding to the above described wider part 55 may be also provided on the first detection arm 42.

The above described first drive arm 46 and second drive arm 47 may be vibrated both in the in-plane directions (X-axis directions) and the out-of-plane directions (Z-axis directions) as shown in FIGS. 10A and 10B. In this regard, the impedance is lower as the drive direction and the vibration direction are closer, and the drive direction may be selected. That is, the impedance is lower in the configuration of FIG. 10A in the case of vibration in directions closer to the Z-axis directions and in the configuration of FIG. 10B in the case of vibration in directions closer to the X-axis directions.

Package

Next, returning to FIG. 6, the package 9a as a housing container that houses and fixes the gyro element 40 will be explained. As shown in FIG. 6, the package 9a has the plate-like base substrate 91a, the frame-like frame member 92a, and the plate-like lid member 93a. The base substrate 91a, the frame member 92a, and the lid member 93a are stacked in this order from the downside to the upside (in the +Z direction). The base substrate 91a and the frame member 92a are formed using a ceramics material, which will be described later, or the like, and integrally baked with each other and joined. The frame member 92a and the lid member 93a are joined by an adhesive, a brazing filler metal, or the like. Further, the package 9a houses the gyro element 40 in the internal space S defined by the base substrate 91a, the frame member 92a, and the lid member 93a. Note that, in addition to the gyro element 40, electronic components (oscillator circuit) that drive the gyro element 40 etc. may be housed within the package 9a.

As a constituent material of the base substrate 91a, an insulating (non-conducting) material is preferable. For example, various kinds of glass, various kinds of ceramics materials including oxide ceramics, nitride ceramics, carbide-based ceramics, various kinds of resin materials including polyimide, or the like may be used.

Further, as a constituent material of the frame member 92a and the lid member 93a, for example, the same constituent material as the base substrate 91a, various kinds of metal materials including Al, Cu, and kovar, various kinds of glass, or the like may be used.

To the upper surface of the base substrate 91a, the above described gyro element 40 is fixed via the fixing material 96a. The fixing material 96a includes an epoxy-based, polyimide-based, or silicone-based adhesive, for example. The fixing material 96a is formed by applying an uncured (unsolidified) adhesive onto the base substrate 91a, further, mounting the gyro element 40 on the adhesive, and curing and solidifying the adhesive. Thereby, the gyro element 40 is reliably fixed to the base substrate 91a. Note that the fixation may be performed using an epoxy-based, polyimide-based, or silicone-based conducting adhesive containing conducting particles.

Action of Gyro Sensor

The configuration of the gyro sensor 1a has been explained. The gyro sensor 1a detects the angular velocity ωy around the Y-axis and the angular velocity ωz around the Z-axis in the following manner. As below, the explanation will be made using FIG. 10A to 12, and illustration of the respective electrodes and groove portions will be omitted in FIGS. 11 and 12 for convenience of explanation.

Without application of an angular velocity, when alternating voltages are applied between the drive part containing the third electrode 62a, the fourth electrode 62b, and the piezoelectric layer (piezoelectric film) 63 as the piezoelectric member and the drive part containing the fifth electrode 64a, the sixth electrode 64b, and the piezoelectric layer (piezoelectric film) 63 as the piezoelectric member, as shown in FIGS. 10A and 10B, the first, second drive arms 46, and the third, fourth drive arms 48, 49 (not shown) respectively obliquely vibrate because they have asymmetric parts. Further, the vibrations are plane-symmetric vibrations of the first, third drive arms 46, 48 and the second, fourth drive arms 47, 49 (see FIG. 7) with respect to the YZ-plane intersecting with the center of gravity G.

In this regard, as described above, the first, third drive arms 46, 48 and the second, fourth drive arms 47, 49 vibrate plane-symmetrically with respect to the YZ-plane intersecting with the center of gravity G, and thus, the vibrations of the first, second, third, fourth drive arms 46, 47, 48, 49 in the X-axis directions are cancelled. Accordingly, the first, second detection arms 42, 43 hardly vibrate in the X-axis directions. On the other hand, the first, second, third, fourth drive arms 46, 47, 48, 49 vibrate toward the same side in the Z-axis directions with each other, and the vibrations of the first, second, third, fourth drive arms 46, 47, 48, 49 in the Z-axis directions are not cancelled. Accordingly, the first, second detection arms 42, 43 flexurally vibrate in the Z-axis directions opposite to the first, second, third, fourth drive arms 46, 47, 48, 49 to balance with the first, second, third, fourth drive arms 46, 47, 48, 49 as shown in FIGS. 10A and 10B. Note that the vibration directions of the first, second, third, fourth drive arms 46, 47, 48, 49 are not limited to the vibration directions shown in FIGS. 10A and 10B, but may be opposite to the vibration directions shown in FIGS. 10A and 10B, for example. The vibration directions may be appropriately selected depending on a desired frequency or a driving unit.

Under the condition, when the angular velocity ωz around the Z-axis is applied to the gyro sensor 1a, Coriolis forces A act and vibrations shown by arrows B (angular velocity around Z-axis detection vibration mode) are excited by the Coriolis forces A as drive force as shown in FIG. 11. In this regard, deformation generated in the first, second detection arms 42, 43 is in the opposite direction with respect to the X-axis. Further, it is preferable that the detection vibration mode is at a frequency within ±10% of the drive frequency. Note that, regarding the vibration directions of the first, second detection arms 42, 43, in other words, the first, second detection arms 42, 43 vibrate in the same rotation direction with respect to the Z-axis. This is because the first, second, third, fourth drive arms 46, 47, 48, 49 vibrate as shown in FIG. 11 by the action of the Coriolis forces A and the first, second detection arms 42, 43 respectively extend toward the upside and the downside with the center base part 41 in between, and thereby, the first detection arm 42 is deformed according to the first, second drive arms 46, 47 and the second detection arm 43 is deformed according to the third, fourth drive arms 48, 49.

On the other hand, when the angular velocity ωy around the Y-axis is applied to the gyro sensor 1a, Coriolis forces A act and vibrations shown by arrows B (angular velocity around Y-axis detection vibration mode) are excited by the Coriolis forces A as drive force as shown in FIG. 12. In this regard, deformation generated in the first, second detection arms 42, 43 is in the same direction with respect to the X-axis. Further, it is preferable that the detection vibration mode is at a frequency within ±10% of the drive frequency. Note that, regarding the vibration directions of the first, second detection arms 42, 43, in other words, the first, second detection arms 42, 43 vibrate in the same direction with respect to the X-axis. This is because the first, second, third, fourth drive arms 46, 47, 48, 49 vibrate as shown in FIG. 12 by the action of the Coriolis forces A and Coriolis forces in the same direction with respect to the X-axis direction and in the opposite directions to the first, second, third, fourth drive arms 46, 47, 48, 49 act, and thereby, the first, second detection arms 42, 43 vibrate in the same direction with respect to the X-axis direction.

In the gyro sensor 1a, the angular velocity ωz and the angular velocity ωy may be respectively and independently detected using differences in the vibration directions of the first, second detection arms 42, 43 when the angular velocity ωz around the Z-axis is applied and when the angular velocity ωy around the Y-axis is applied as described above. Note that the detection parts provided on the first detection arm 42 are the first detection part 75 and the second detection part 76 (see FIGS. 8A and 8B) and the detection parts provided on the second detection arm 43 are a third detection part (not shown) and a fourth detection part (not shown).

In the specific explanation, when the angular velocity ωz is applied, signals (voltages) V1 extracted from the first detection part 75 and the second detection part 76 are signals (voltages) +Vz due to the angular velocity ωz and signals (voltages) V2 extracted from the third detection part and the fourth detection part are signals (voltages) −Vz due to the angular velocity ωz. That is, V1=+Vz, V2=−Vz.

On the other hand, when the angular velocity ωy is applied, signals V1 extracted from the first detection part 75 and the second detection part 76 are signals +Vy due to the angular velocity ωy and signals V2 extracted from the third detection part and the fourth detection part are signals +Vy due to the angular velocity ωy. That is, V1=+Vy, V2=+Vy. Note that the signs are the same between the signals V1, V2 because a strain detection unit is adapted to produce signals with different signs for the angular velocity around the Z-axis as described above.

Accordingly, when an angular velocity ωyz around an axis having both direction components in the Y-axis direction and the Z-axis direction (i.e., an axis oblique with respect to both axis of the Y-axis and the Z-axis) is applied to the gyro sensor 1a, signals V1 extracted from the first detection part 75 and the second detection part 76 are (+Vy)+(+Vz) and signals V2 extracted from the third detection part and the fourth detection part are (+Vy)+(−Vz). That is, V1=Vy+Vz, V2=Vy−Vz.

Thus obtained signals V1, V2 are added or subtracted, and thereby, the angular velocity ωy around the Y-axis and the angular velocity ωz around the Z-axis of the angular velocity ωyz may be separated and the angular velocity ωy and the angular velocity ωz may be respectively and independently detected. Specifically, V1+V2=2Vy, and the signal Vz due to the angular velocity ωz may be removed. Thereby, the angular velocity ωy around the Y-axis is obtained. On the other hand, V1−V2=2Vz, and the signal Vy due to the angular velocity ωy may be removed. Thereby, the angular velocity ωz around the Z-axis is obtained. According to the gyro sensor 1a, the angular velocity ωy around the Y-axis and the angular velocity ωz around the Z-axis may be respectively and independently detected in a simple manner.

The calculation may be performed using an IC chip or the like (not shown) connected to the gyro sensor 1a. Note that the signs of the above described signals "Vz", "Vy" are reversed depending on the wiring configuration. That is, the "+Vz" may become "−Vz" and "−Vz" may become "+Vz", and the "+Vy" may become "−Vy" and "−Vy" may become "+Vy".

According to the above explained second embodiment, the gyro element 40 having the first, second, third, fourth drive arms 46, 47, 48, 49 that can obliquely vibrate may be obtained by simple processing including etching. With the obliquely vibrated first, second, third, fourth drive arms 46, 47, 48, 49, the gyro element 40 that can respectively and independently detect the angular velocity ωy around the Y-axis and the angular velocity ωz around the Z-axis may be obtained. Further, the groove portions 50, 51, 52, 53 provided on the first, second, third, fourth drive arms 46, 47, 48, 49 may be formed by digging from the one surfaces (first surfaces 10) by etching or the like, and thereby, the groove portions 50, 51, 52, 53 containing the asymmetric section shapes with respect to the first virtual center lines P1 may be easily formed. The groove portions 50, 51, 52, 53 may be easily formed as described above, and thereby, the processing yield of the gyro element 40 is improved. Further, the drive parts containing the piezoelectric layers 63 are provided on the second surfaces 61 as the rear surfaces for the first surfaces 60. The second surfaces 61 are flat surfaces without the groove portions 50, 51, 52, 53, and the drive parts may be easily formed thereon. Therefore, according to the configuration, the first, second, third, fourth drive arms 46, 47, 48, 49 in which the groove portions 50, 51, 52, 53 are provided on the one surfaces (first surfaces 60) and the drive parts are provided on the rear surfaces (second surfaces 61) may be easily formed, and the gyro element 40 that can continue stable oblique vibration, i.e., the gyro sensor 1a may be inexpensively provided.

Figure 13:
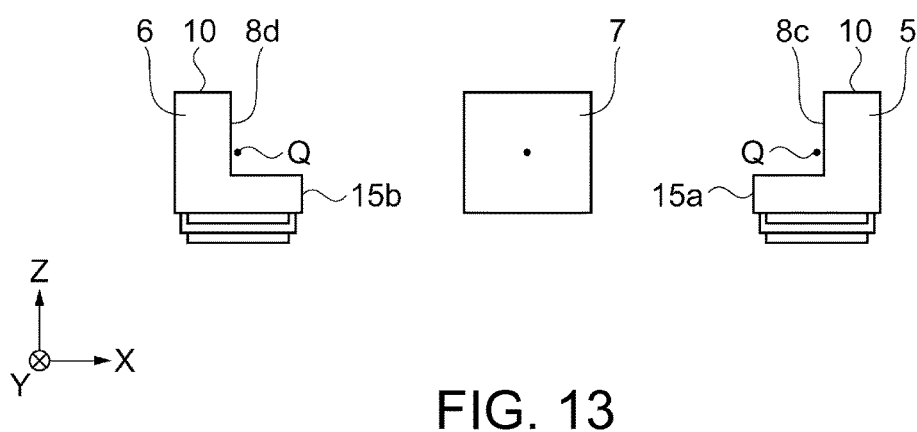
FIG. 13 is a sectional view of a modified example of recessed portions.

Referring to FIG. 13, a modified example of the recessed portions will be explained. In the above described embodiments, as the recessed portions, the configurations of the groove portions 8a, 8b and the groove portions 50, 51, 52, 53 dug from the one surfaces (first surfaces 10, 60) and opening to the one surfaces (first surfaces 10, 60) have been explained, however, as the configuration of the recessed portions that generate oblique vibration, the configuration shown in FIG. 13 may be employed. FIG. 13 is a sectional view showing the modified example of the recessed portions. A step portion 8c as the recessed portion of the modified example is a step portion having a bottom opening to both the first surface 10 of the drive arm 5 and a side surface 15a at the adjustment arm 7 side. The step portion 8c is provided on the drive arm 5 to deviate in the direction in which the adjustment arm 7 is located. Further, a step portion 8d is a step portion having a bottom opening to both the first surface 10 of the drive arm 6 and a side surface 15b at the adjustment arm 7 side. The step portion 8d is provided on the drive arm 6 to deviate in the direction in which the adjustment arm 7 is located.

The step portions are provided, and thereby, like the groove portions of the above described embodiments, the drive arms 5, 6 have asymmetric section shapes with respect to the first virtual center lines passing through the center Q in the X-axis direction and the second virtual center lines passing through the center Q in the Z-axis direction. Accordingly, as will be described later, when the drive arms 5, 6 are vibrated in the X-axis directions (in-plane directions), a vibration in the Z-axis directions (out-of-plane directions) is newly excited by the vibration. As a result, the drive arms 5, 6 may be flexurally vibrated (hereinafter, also simply referred to as "oblique vibration") in directions having both direction components in the X-axis directions and the Z-axis directions, in other words, in directions oblique to both axes of the X-axis and the Z-axis. Note that the same modified example may be applied to the configuration of the second embodiment.

Further, the example in which one adjustment arm 7 is provided has been explained in the first embodiment, however, any number of adjustment arms may be provided. Furthermore, regarding the drive arms 5, 6, any number of drive arms may be provided.

In addition, in the embodiment 2, the configuration in which the first, second, third, fourth drive arms 46, 47, 48, 49 and the first, second detection arms 42, 43 are provided has been explained, however, any number of drive arms and detection arms may be provided.

Electronic Apparatuses

Next, as vibrating devices according to one embodiment of the invention, electronic apparatuses to which any one of the vibrator 1 using the vibrating element 2 or the gyro sensor 1a using the gyro element 40 is applied will be explained in detail with reference to FIGS. 14 to 16. Note that, in the explanation, examples of application of the gyro sensor 1a are shown.

Figure 14:
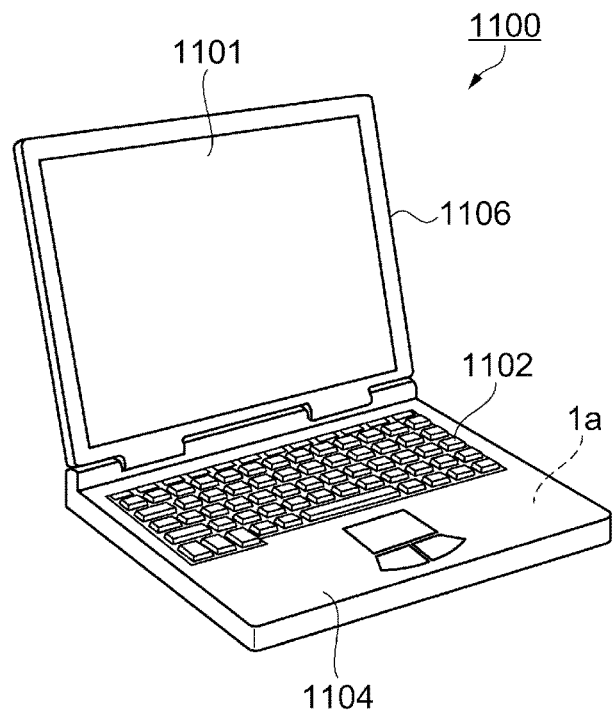
FIG. 14 is a perspective view showing a configuration of a mobile personal computer as an example of an electronic apparatus.

FIG. 14 is a perspective view showing an outline of a configuration of a mobile (or notebook) personal computer as an electronic apparatus including the gyro sensor 1a as an electronic device according to one embodiment of the invention. In the drawing, a personal computer 1100 includes a main body unit 1104 having a keyboard 1102 and a display unit 1106 having a display part 1101, and the display unit 1106 is rotatably supported via a hinge structure part with respect to the main body unit 1104. The personal computer 1100 contains the gyro sensor 1a having a function of detecting an angular velocity.

Figure 15:
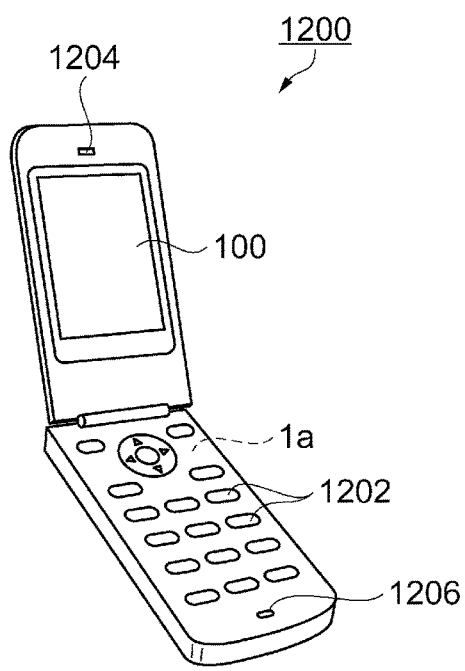
FIG. 15 is a perspective view showing a configuration of a cell phone as an example of the electronic apparatus.

FIG. 15 is a perspective view showing an outline of a configuration of a cell phone (including a PHS) as the electronic apparatus including the gyro sensor 1a as the electronic device according to one embodiment of the invention. In the drawing, a cell phone 1200 includes a plurality of operation buttons 1202, an ear piece 1204, and a mouthpiece 1206, and a display part 100 is provided between the operation buttons 1202 and the ear piece 1204. The cell phone 1200 contains the gyro sensor 1a having a function of detecting an angular velocity.

Figure 16:
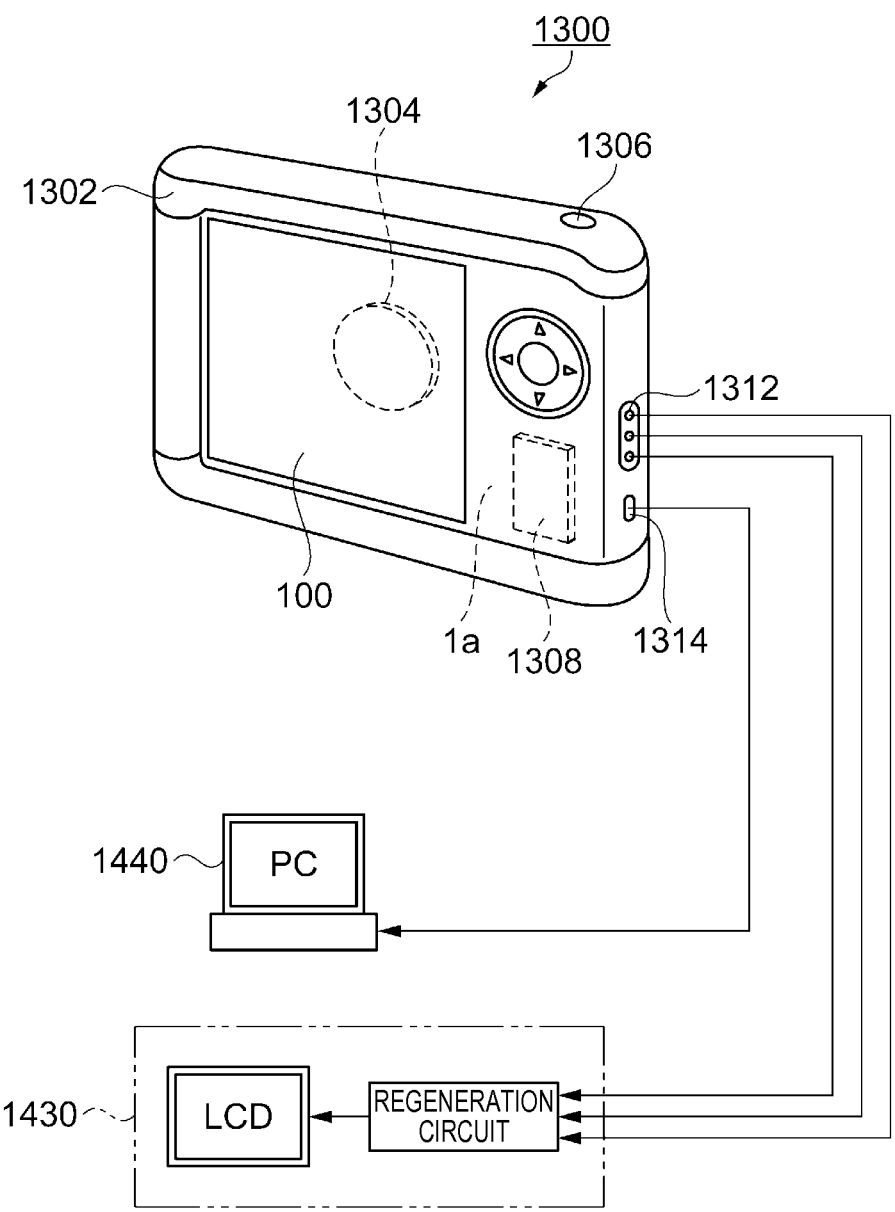
FIG. 16 is a perspective view showing a configuration of a digital steel camera as an example of the electronic apparatus.

FIG. 16 is a perspective view showing an outline of a configuration of a digital still camera as the electronic apparatus including the gyro sensor 1a as the electronic device according to one embodiment of the invention. Note that, in the drawing, connection to an external device is simply shown. Here, in a film camera in related art, a silver halide photographic film is exposed to light by an optical image of a subject and, on the other hand, a digital still camera 1300 photoelectrically converts an optical image of a subject using an image sensing device such as a CCD (Charge Coupled Device) and generates imaging signals (image signals).

On a back surface of a case (body) 1302 in the digital still camera 1300, a display part 100 is provided and adapted to display based on the imaging signals by the CCD, and the display part 100 functions as a finder that displays the subject as an electronic image. Further, on the front side (the rear side in the drawing) of the case 1302, a light receiving unit 1304 including an optical lens (imaging system), the CCD, etc. is provided.

When a photographer checks the subject image displayed on the display part 100 and presses down a shutter button 1306, the imaging signals of the CCD at the time are transferred and stored into a memory 1308. Further, in the digital still camera 1300, a video signal output terminal 1312 and an input/output terminal for data communication 1314 are provided on the side surface of the case 1302. Furthermore, as illustrated, a television monitor 1430 is connected to the video signal output terminal 1312 and a personal computer 1440 is connected to the input/output terminal for data communication 1314, respectively, as appropriate. In addition, by predetermined operation, the imaging signals stored in the memory 1308 are output to the television monitor 1430 and the personal computer 1440. The digital still camera 1300 contains the gyro sensor 1a having a function of detecting an angular velocity.

Note that the gyro sensor 1a as the electronic device according to one embodiment of the invention may be applied not only to the personal computer (mobile personal computer) in FIG. 14, the cell phone in FIG. 15, and the digital still camera in FIG. 16 but also to an electronic apparatus including an inkjet ejection device (for example, an inkjet printer), a laptop personal computer, a television, a video camera, a video tape recorder, a car navigation system, a pager, a personal digital assistance (with or without communication function), an electronic dictionary, a calculator, an electronic game machine, a word processor, a work station, a videophone, a security television monitor, electronic binoculars, a POS terminal, a medical apparatus (for example, an electronic thermometer, a sphygmomanometer, a blood glucose meter, an electrocardiographic measurement system, an ultrasonic diagnostic system, or an electronic endoscope), a fish finder, various measurement instruments, meters and gauges (for example, meters for vehicles, airplanes, and ships), and a flight simulator, for example.

Moving Object

Figure 17:
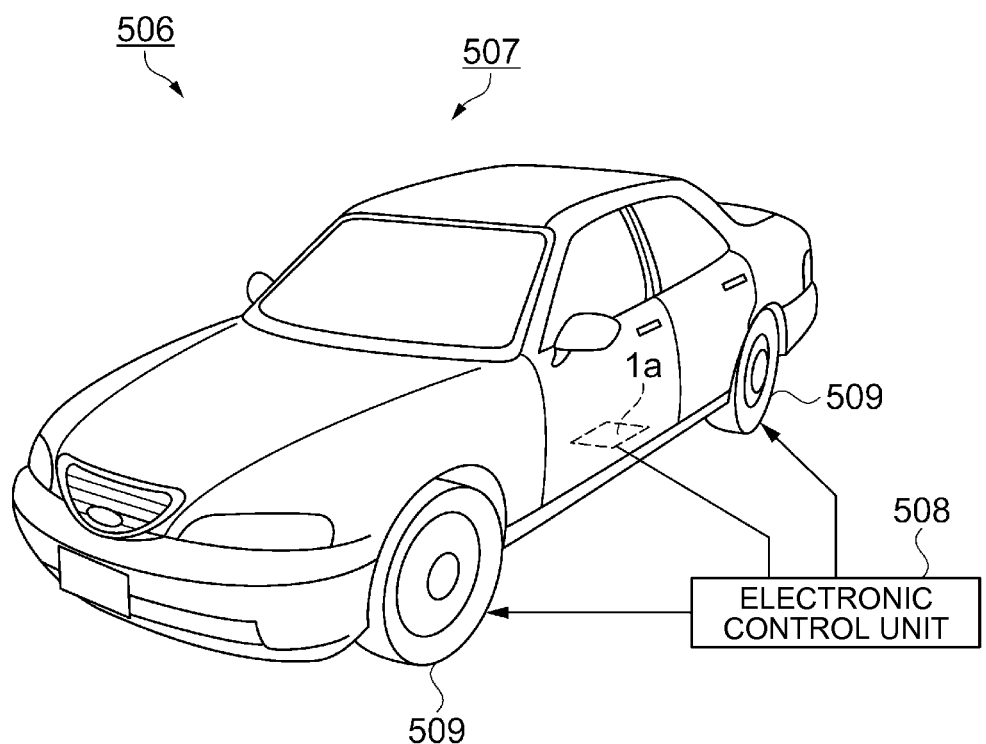
FIG. 17 is a perspective view showing a configuration of an automobile as an example of a moving object.

FIG. 17 is a perspective view schematically showing an automobile as an example of a moving object. In an automobile 506, the gyro sensor 1a as the electronic device according to the invention is mounted. For example, as shown in the drawing, in the automobile 506 as the moving object, an electronic control unit 508 that contains the gyro sensor 1a and controls tires 509 etc. is mounted on a vehicle body 507. In addition, the gyro sensor 1a may be widely applied to an electric control unit (ECU) including keyless entry, an immobilizer, a car navigation system, a car airconditioner, an antilock brake system (ABS), an airbag, a tire pressure monitoring system (TPMS), engine control, a battery monitor of a hybrid car or an electric car, and a vehicle body attitude control unit.

The entire disclosure of Japanese Patent Application No. 2013-166004, filed Aug. 9, 2013 is expressly incorporated by reference herein.

What is claimed is:

1. A vibrating element comprising:
a base having a first base surface and a second base surface opposite to the first base surface;
a first drive arm that extends from the base in an extension direction, the first drive arm having a first arm center line passing through a center of a width of the first drive arm in the extension direction, the first drive arm having:
a first arm surface and a second arm surface opposite to the first arm surface; and
a first groove that is provided in the first arm surface along the extension direction, a first groove bottom of the first groove being closer to the second arm surface than the first arm surface;
a first drive element that is provided on the second arm surface and that extends in the extension direction, the first drive element having:
a first electrode;
a second electrode; and
a first piezoelectric layer sandwiched between the first electrode and the second electrode along a direction normal to the second arm surface;
a second drive arm that extends from the base in the extension direction, the second drive arm having a second arm center line passing through a center of a width of the second drive arm in the extension direction, the second drive arm having:
a third arm surface and a fourth arm surface opposite to the third arm surface; and
a second groove that is provided in the third arm surface along the extension direction, a second groove bottom of the second groove being closer to the fourth arm surface than the third arm surface; and
a second drive element that is provided on the fourth arm surface and that extends in the extension direction, the second drive element having:
a third electrode;
a fourth electrode; and
a second piezoelectric layer sandwiched between the third electrode and the fourth electrode along a direction normal to the fourth arm surface,
wherein the first groove and the second groove are laterally positioned offset toward a center between the first and second drive arms from the first and second arm center lines of the first and second drive arms, and
the first base surface, the second base surface, the first arm surface, the second arm surface, the third arm surface, and the fourth arm surface extend parallel to a same plane.

2. The vibrating element according to claim 1,
wherein the first groove has first and second ends opposite to each other in the extension direction, the first end is closer to the base than the second end in a plan view,
the base and the first end are spaced apart from each other in the plan view,
the second groove has third and fourth ends opposite to each other in the extension direction, the third end is closer to the base than the fourth end in the plan view, and
the base and the third end are spaced apart from each other in the plan view.

3. The vibrating element according to claim 1, further comprising:
a detection arm connected to the base.

4. A vibrating device comprising:
the vibrating element according to claim 1; and
a housing container in which the vibrating element is housed.

5. A vibrating device comprising:
the vibrating element according to claim 2; and
a housing container in which the vibrating element is housed.

6. The vibrating element according to claim 1,
wherein parts of the first and second grooves reach the base.

7. The vibrating element according to claim 1, further comprising:
wherein an adjustment arm extends from the base and is provided between the first drive arm and the second drive arm in the plan view.

8. A vibrating device comprising:
the vibrating element according to claim 6; and
a housing container in which the vibrating element is housed.

* * * * *